(12) United States Patent
Iwaki

(10) Patent No.: US 8,758,195 B2
(45) Date of Patent: Jun. 24, 2014

(54) TRAVELING SPEED CONTROL SYSTEM FOR WORK VEHICLE

(71) Applicant: Kanzaki Kokyukoki Mfg. Co., Ltd., Hyogo (JP)

(72) Inventor: Koji Iwaki, Hyogo (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 0 days.

(21) Appl. No.: 13/932,775

(22) Filed: Jul. 1, 2013

(65) Prior Publication Data

US 2014/0011638 A1 Jan. 9, 2014

(30) Foreign Application Priority Data

Jul. 3, 2012 (JP) ................................. 2012-149509

(51) Int. Cl.
*B60W 10/06* (2006.01)
*B60W 10/10* (2012.01)

(52) U.S. Cl.
USPC .......................................................... 477/52

(58) Field of Classification Search
CPC . B60W 10/06; B60W 10/103; B60W 10/113; B60W 20/30; B60W 2510/1005; B60W 2540/10; B60W 2710/0605; B60W 2710/1005

USPC .......................................... 477/2, 52, 68, 111
See application file for complete search history.

(56) References Cited

U.S. PATENT DOCUMENTS

| 7,987,941 B2 * | 8/2011 | Shirao et al. .................. 180/307 |
| 2006/0172853 A1 * | 8/2006 | Ishibashi et al. ................ 477/52 |
| 2010/0051410 A1 * | 3/2010 | Iwaki et al. ................... 192/221 |

FOREIGN PATENT DOCUMENTS

JP 2004-255919 9/2004

* cited by examiner

*Primary Examiner* — Edwin A Young
(74) *Attorney, Agent, or Firm* — Sterne, Kessler, Goldstein & Fox P.L.L.C.

(57) ABSTRACT

A traveling speed control system for a work vehicle comprises an engine having a variable throttle opening; a hydrostatic transmission driven by the engine, the hydrostatic transmission having a variable output/input speed ratio; a travel mode selecting manipulator for selecting either a work travel mode or a normal travel mode; and an acceleration manipulator for setting a traveling speed of the work vehicle. Increase of the throttle opening during idling, of the engine is prior to increase of the output/input speed ratio for increasing the traveling speed of the work vehicle when the work travel mode is selected, and the increase of the throttle opening prior to the increase of the output/input speed ratio is canceled when the normal travel mode is selected.

6 Claims, 13 Drawing Sheets

TRAVELING SPEED CONTROL SYSTEM FOR WORK VEHICLE

BACKGROUND OF THE INVENTION

1. Field of the Invention

The present invention relates to a traveling speed control system for a work vehicle equipped with an engine having a variable throttle opening and a hydrostatic transmission (hereinafter, referred to as "HST") whose output/input speed ratio is increased in correspondence to an increase in a set traveling speed so as to increase the traveling speed of the work vehicle.

Incidentally, in the major cases in the following description, the "traveling speed control system" for a work vehicle is referred to as "vehicle speed control system", and the "traveling speed" of the work vehicle is referred to as "vehicle speed".

2. Related Art

There is a well-known conventional traveling speed control system for a work vehicle equipped with an engine and an HST, as disclosed by JP 2004-255919 A. This vehicle speed control system increases the vehicle speed by increasing a throttle opening of the engine and an output/input speed ratio of the HST in correspondence to an increase of vehicle speed set by an acceleration manipulator (hereinafter referred to as "accelerator"). The throttle opening is at its minimum during idling of the engine before start of the vehicle. An increase rate of the throttle opening during, increase of vehicle speed from 0 (the idling of the engine) to an intermediate speed is smaller than that during increase of vehicle speed from the intermediate speed to the maximum speed, and meanwhile, an increase rate of the output/input speed ratio during increase of vehicle speed from 0 to an intermediate speed is smaller than that during increase of vehicle speed from the intermediate speed to the maximum speed. The throttle opening increasing at the large increase rate ensures a smooth start of the vehicle and stable low speed travel of the vehicle.

However, the disclosed conventional vehicle speed control system postulates that the work vehicle is not heavily loaded during the engine idling before the start of traveling of the work vehicle, i.e., before the accelerator is manipulated to set a vehicle speed larger than 0. If the work vehicle is adapted to be heavily loaded with a work device, e.g., a cultivator, a mower unit or a pest control machine, during the engine idling before traveling start of the vehicle or during a low speed working travel of the vehicle on a rough field, the engine power may be insufficient to start the vehicle, thereby causing unstable start or working travel of the vehicle or undesired stopping of the engine.

On the other hand, if a work vehicle adapted to receive such a heavy load travels normally with no heavy load, the increase of the throttle opening at the large increase rate for starting the vehicle causes excessively high-speed rotation of the engine, shortening the life of the engine, and causes waste consumption of fuel, increasing costs.

SUMMARY OF THE INVENTION

A traveling speed control system for a work vehicle according to the invention comprises an engine whose throttle has a variable throttle opening; an HST driven by the engine, the HST having a variable output/input speed ratio; a travel mode selecting manipulator for selecting either a work travel mode or a normal travel mode; and an acceleration manipulator for setting a traveling speed of the work vehicle.

To solve the above-mentioned problems, in a first aspect, the traveling speed control system is configured so that increase of the throttle opening during idling of the engine (while the vehicle is stationary) is prior to increase of the output/input speed ratio for increasing the traveling speed of the work vehicle when the work travel mode is selected, and the increase of the throttle opening prior to the increase of the output/input speed ratio is canceled when the normal travel mode is selected.

Therefore, if the work travel mode is selected so that the work vehicle is expected to be heavily loaded with a work device, e.g., a cultivator, a mower unit or a pest control machine, the prioritized increase of throttle opening during idling of the engine ensures a smooth start of the vehicle and a stable low speed work travel of the vehicle free from the engine stopping. On the other hand, if the normal travel mode is selected so that the work vehicle is expected to be free from heavy load, the, prioritized increase of throttle opening during idling of the engine is canceled so as to reduce the fuel consumption and to prevent the engine from rotating at excessively high speed such as to shorten the life of the engine.

In the first aspect, the traveling speed control system further comprises a throttle setting device for setting a throttle opening. When the work travel mode is selected, the throttle is automatically set at the throttle opening set by the throttle setting device before traveling of the work vehicle so as to realize the increase of throttle opening prior to the increase of output/input speed ratio, and the set throttle opening is kept constant during traveling of the work vehicle in the work travel mode.

Therefore, once a throttle opening is set by the throttle setting device, only by manipulating the travel mode selecting manipulator to select the work travel mode, the throttle is automatically set at the set throttle opening without an operator's troubled manipulation before traveling of the work vehicle so as to ensure the smooth start of the vehicle and the stable low speed traveling of the vehicle in the work travel mode free from misadjusting of throttle opening.

Alternatively, in the first aspect, the traveling speed control system further comprises a throttle setting manipulator for setting a throttle opening, and an alarm. The throttle opening set by the throttle setting manipulator is kept constant during traveling of the work vehicle in the work travel mode. When the work travel mode is selected and the throttle setting manipulator is not manipulated during idling of the engine to set a throttle opening for traveling of the work vehicle in the work travel mode, the alarm alarms an operator to manipulate the throttle setting manipulator for setting a throttle opening.

Therefore, even if the setting of the throttle opening in the work travel mode relies on an operator's manipulation, the alarm surely prevents the work vehicle from wrongly starting before the throttle setting manipulator is manipulated to set a throttle opening, thereby ensuring the smooth start of the vehicle and the stable low speed traveling of the vehicle in the work travel mode free from misadjusting of throttle opening.

Alternatively, to solve the above-mentioned problems, in a second aspect, the traveling speed control system is configured so that the throttle opening and the output/input speed ratio are increased in correspondence to an increase of the traveling speed set by manipulating the acceleration manipulator from 0 to the maximum. When the work travel mode is selected, an increase rate of the throttle opening is larger at the start of traveling of the work vehicle than an average increase rate of the throttle opening during increase of the traveling speed of the work vehicle from 0 to the maximum and is reduced according to an increase of the set traveling speed, and an increase rate of the output/input speed ratio is smaller at the start of traveling of the work vehicle than an average increase rate of the output/input speed ratio during increase of the traveling speed of the work vehicle from 0 to the maximum and is increased according to an increase of the set traveling speed. When the normal travel mode is selected, an increase rate of the throttle opening is smaller at the start of traveling of the work vehicle than an average increase rate of the throttle opening during increase of the traveling speed of the work vehicle from 0 to the maximum and is increased according to an increase of the set traveling speed, and an increase rate of the output/input speed ratio is larger at the start of traveling of the work vehicle than an average increase rate of the output/input speed ratio during increase of the traveling speed of the work vehicle from 0 to the maximum and is reduced according to an increase of the set traveling speed.

Therefore, if the work travel mode is selected so that the work vehicle is expected to be heavily loaded with a work device, the large increase rate of throttle opening at start of traveling of the vehicle ensures a smooth start of the vehicle and stable low speed work travel of he vehicle free from the engine stopping. On the other hand, if the normal travel mode is selected so that the work vehicle is expected to be free from heavy load, the small increase rate of throttle opening at s art of traveling of the vehicle reduces the fuel consumption and prevents the engine from rotating at excessively high speed such as to shorten the life of the engine. Further, in an early stage, of increase of the vehicle speed from 0 in either the work travel mode or the normal travel mode, either the increase rate of throttle opening or the increase rate of output/input speed ratio is smaller than its average increase rate for increasing the vehicle speed from 0 to the maximum, thereby reducing load on the engine or the HST, and thereby prolonging the lives of the engine and the HST.

In either the first or second aspect, the work vehicle is equipped with a multi-speed transmission having a low speed drive train and a high speed drive train such that either the low or high speed drive train is selected to transmit power outputted from the hydrostatic transmission. The selection of the low speed drive train means the selection of the work travel mode, and the selection of the high speed drive train means the selection of the normal travel mode.

Therefore, when the work vehicle travels in the work travel mode, the multi-speed transmission takes out a high torque from the output power of the HST via the low speed drive train and supplies the high torque to the work device, thereby ensuring required work efficiency. When the work vehicle travels in the normal travel mode, the multi-speed transmission takes out a high speed rotation from the output power of the HST via the high speed drive train and provides drive wheels of the work vehicle with the high speed rotation, thereby ensuring swift traveling of the work vehicle.

These, further and other objects, features and advantages of the invention will appear more fully in the following detailed description with reference to attached drawings.

DETAILED DESCRIPTION OF THE INVENTION

Figure 1:
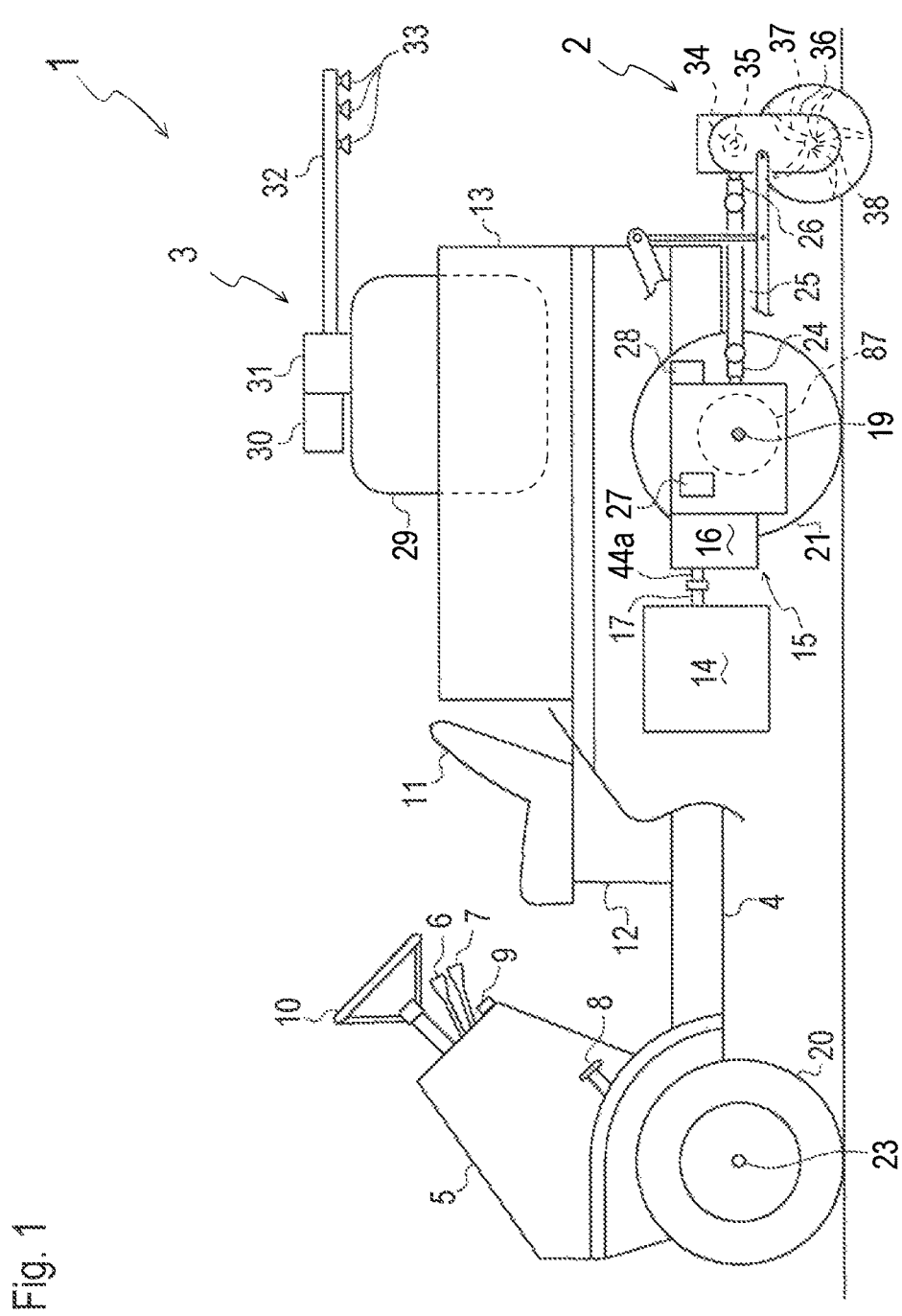
FIG. 1 is a side view of a utility vehicle serving as a work vehicle provided with a vehicle speed control system according to an embodiment of the invention.
Figure 2:
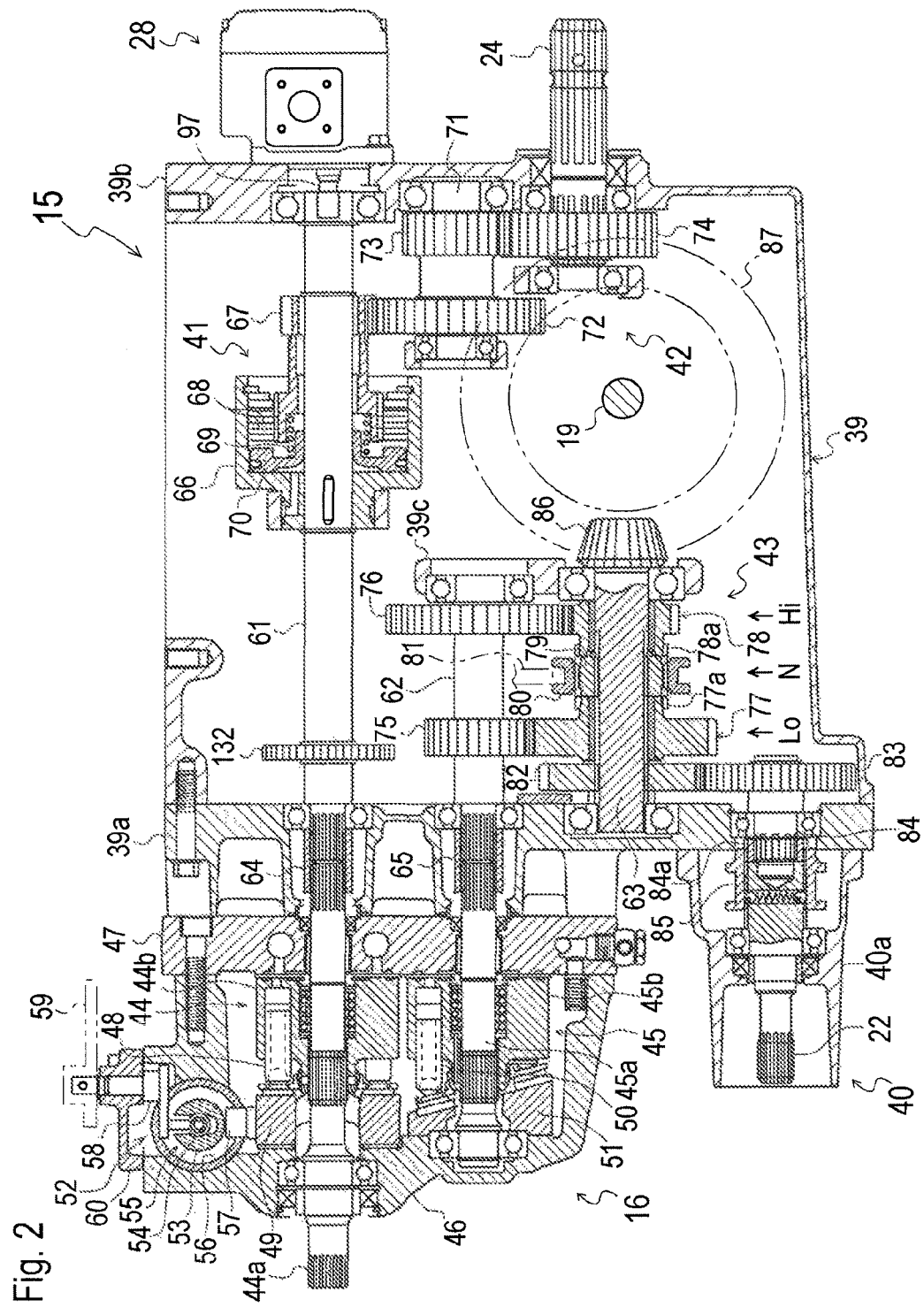
FIG. 2 is a sectional side view of a transaxle for the vehicle, the transaxle being provided with an HST.

Referring to FIGS. 1 and 2, a utility vehicle 1 (hereinafter, simply referred to as "vehicle 1") will be described. Vehicle 1 has a fore-and-aft extended chassis 4 and a front cover 5 mounted on a front end portion of chassis 4. An instrument board is provided on an upper portion of front cover 5. A reverser lever 6, a travel mode setting lever 7 (serving as a travel mode setting manipulator) and a throttle setting dial 9 (serving as a throttle setting device) are provided on the instrument board. Travel mode setting lever 7 serves as a sub speed control manipulator for controlling a later-discussed sub speed control unit 43. A steering wheel 10 is provided on the instrument board above levers 6 and 7 and dial 9. An accelerator pedal 8 (serving as an acceleration manipulator) is provided on a lower portion of front cover 5. Accelerator pedal 8 serves as an engine rotary speed control manipulator for a later-discussed engine 14 and also serves as a main speed control manipulator for controlling an output/input speed ratio of a later-discussed HST 16.

A mount base 12 is mounted on chassis 4 so as to extend from a fore-and-aft middle portion of chassis 4 to a rear end of chassis 4. An operator's seat 11 is mounted on a front portion of an upper surface of mount base 12. A load-carrying tray 13 is mounted on the upper surface of mount base 12 so as to extend rearward from operator's seat 11. A pest control machine 3 serving as a hydraulically driven work device is loaded on load-carrying tray 13.

Pest control machine 3 includes a pest control liquid tank 29, a hydraulic motor 30, a pest control pump 31 and a spray beam 32 with nozzles 33. Hydraulic motor 30 and pest control pump 31 are mounted on a top of pest control liquid tank 29, and spray beam 32 is extended rearward from pest control pump 31. Hydraulic motor 30 is driven by pressurized fluid delivered from later-discussed power taking-off (PTO) hydraulic pump unit 27 or 28 (or units 27 and 28) of a transaxle 15. Pest control pump 31 is driven by hydraulic motor 30 so as to deliver pest control liquid from tank 29 to spray beam 32, thereby spraying pest control liquid from nozzles 33 on spray beam 32.

An engine 14 and transaxle 15 are mounted on chassis 4 and are disposed under the upper surface of mount base 12. Transaxle 15 is provided at a front portion thereof with a hydrostatic transmission (hereinafter referred to as "HST")

16. Engine 14 has an engine output shaft 17 extended rearward, and HST 16 has a pump shaft 44a serving as an input shaft of transaxle 15 and projecting forward to be drivingly connected to engine output shaft 17.

Right and left rear axles 19 are differentially connected to each other via a differential unit in transaxle 15 and are extended rightward and leftward so as to be drivingly connected at distal ends thereof to respective right and left rear wheels 21. Transaxle 15 has a front wheel driving power take-off shaft (hereinafter referred to as "front PTO shaft") 22 projecting forward to be drivingly connected to right and left front axles 23 via an unshown drive train. Front axles 23 are supported by a front portion of chassis 4 and are drivingly connected at distal ends thereof to respective right and left front wheels 20.

Transaxle 15 has a work device driving power take-off shaft (hereinafter referred to as "rear PTO shaft") 24 projecting rearward to be drivingly connected via a propeller shaft 25 with universal joints to an input shaft 26 of a cultivator 2 serving as a mechanically driven work device.

Cultivator 2 includes a laterally extended cylindrical beam 34. A transmission casing 36 incorporating a chain or belt transmission or so on is fixed at an upper portion thereof onto a right or left end of beam 34 and supports a laterally extended cultivation claw shaft 38 at a lower portion thereof. A transmission shaft 35 drivingly connected to input shaft 26 is laterally extended through beam 34 and is drivingly connected to cultivation claw shaft 38 via transmission casing 36. Cultivation claws 37 are fixed on cultivation claw shaft 38.

Power taken-off from rear PTO shaft 24 of vehicle 1 is transmitted to cultivation claw shaft 38 via input shaft 26 and transmission shaft 35 so as to rotate cultivation claw shaft 38 with cultivation claws 37, thereby cultivating a field. Spray beam 32 with nozzles 33 is disposed just above cultivator 2 so as to spray the pest control liquid onto the field cultivated by cultivation claws 37 of cultivator 2.

Transaxle 15 will be described with reference to FIGS. 1 to 3. Transaxle 15 includes a transaxle housing 39 and HST 16 mounted on an upper front portion of transaxle housing 39. HST 16 serves as a main speed control unit and also serves as a reverser for selecting either the forward or backward traveling direction of vehicle 1. A front PTO unit 40 including front PTO shaft 22 is mounted on a lower front portion of transaxle housing 39. In transaxle housing 39, a PTO clutch 41 and a reduction gear train 42 are disposed so as to transmit power from pump shaft 44a to rear PTO shaft 24. A sub speed control unit 43 is a multi-speed gear transmission including high and low speed gear trains and is disposed in transaxle housing 39 so as to transmit power outputted from HST 16 to rear axles 19 and front PTO shaft 22 of front PTO unit 40.

HST 16 includes a variable displacement hydraulic pump 44, a fixed displacement hydraulic motor 45 and an HST housing 46 incorporating hydraulic pump 44 and motor 45. HST 16 also includes a center section 47 interposed between a rear end of HST housing 46 and the upper front portion of transaxle housing 39. Hydraulic pump 44 and hydraulic motor 45 are mounted on a vertical front surface of center section 47.

Hydraulic pump 44 includes pump shaft 44a, a cylinder block 44b, plungers 48 and a cradle type movable swash plate 49. Pump shaft 44a is extended fore-and-aft horizontally and is journalled by HST housing 46 and center section 47 via bearings. Pump shaft 44a has a front end projecting forward from HST housing 46 so as to be drivingly connected to engine output shaft 17, and has a rear end projecting rearward from center section 47 into transaxle housing 39. Cylinder block 44b is fixed on pump shaft 44a so as to be rotatably integral with pump shaft 44a. Plungers 48 are reciprocally slidably fitted in cylinder block 44b. Movable swash plate 49 is pivotally and slidably supported by HST housing 46 and abuts against heads, i.e., front ends of plungers 48. The tilt direction and angle of swash, plate 49 are controlled to control the fluid delivery direction and amount of hydraulic pump 44, thereby controlling the rotation direction and speed of a later-discussed motor shaft 45a of hydraulic motor 45.

Hydraulic motor 45 includes motor shaft 45a, a cylinder block 45b, plungers 50 and a fixed swash plate 51. Motor shaft 45a is extended parallel to pump shaft 44a. A front end of motor shaft 45a is journalled by HST housing 46 by a bearing. Motor shaft 45a is journalled by, center section 47 and has a rear end projecting rearward from center section 47 into transaxle housing 39. Cylinder block 45b is fixed on motor shaft 45a so as to be rotatably integral with motor shaft 45a. Plungers 50 are reciprocally slidably fitted in cylinder block 45b. Fixed swash plate 51 is fixed to HST housing 46 and abuts against heads, i.e., front ends of plungers 50.

A pair of main fluid passages are formed in center section 47 so as to constitute a closed fluid circuit fluidly connecting hydraulic pump 44 to hydraulic motor 45. The fluid delivered from hydraulic pump 44 is supplied and returned via the main fluid passages to and from hydraulic motor 45, thereby rotating motor shaft 45a.

HST 16 includes a hydraulic servo unit 52 installed into HST housing 46 and disposed above hydraulic pump 44. Hydraulic servo unit 52 includes a control valve 55 having a piston 53 and a laterally horizontal spool 54 in piston 53. Movable swash plate 49 has a pivot shaft 57 connected to piston 53. Piston 53 laterally horizontally slides according to the axial slide of spool 54 so as to rotate movable swash plate 49.

A top cover 60 pivoting a spool operation arm 58 is fixed to a top portion of HST housing 46 so as to connect spool operation arm 58 to spool 54. An HST control lever 59 is fixed on a top portion of spool operation arm 58 projecting upwardly outward from top cover 60 and is operatively connected to a later-discussed actuator 102 that is controlled by a later-discussed controller 103 according to manipulation of reverser lever 6 and accelerator pedal 8 with reference to FIG. 4.

Transaxle housing 39 has a front opening for the convenience of assembling and dissembling of later-discussed shafts 61, 62 and 63 and has a front wall cover 39a covering the front opening. A PTO clutch input shaft 61 is extended fore-and-aft horizontally and is journalled at a front end portion thereof by front wall cover 39a via a bearing, and is journalled at a rear end portion thereof by a rear wall portion 39b of transaxle housing 39 via a bearing. The above-mentioned rear end portion of pump shaft 44a is coupled to the front end portion of PTO clutch input shaft 61 via a coupling sleeve 64 so as to be rotatably integral with PTO clutch input shaft 61.

A PTO clutch output gear 67 is fitted on PTO clutch input shaft 61 rotatably relative to PTO clutch input shaft 61, and PTO clutch 41 is provided around PTO clutch input shaft 61 so as to be interposed between PTO clutch input shaft 61 and PTO clutch output gear 67. PTO clutch 41 includes a clutch housing 66, friction discs 68, a spring 69 and a piston 70. Clutch housing 66 is fixed on PTO clutch input shaft 61. An axial boss portion of PTO clutch output gear 67 is extended along PTO clutch input shaft 61 and is inserted into clutch housing 66. Piston 70 is axially slidably fitted on PTO clutch input shaft 61 and in clutch housing 66. Spring 69 is interposed between piston 70 and the axial boss portion of PTO clutch output gear 67. In clutch housing 66, friction discs 68 engaged to clutch housing 66 and friction discs 68 engaged to the axial boss portion of PTO clutch output gear 67 are alternately aligned. When an operation fluid is supplied into clutch housing 66 and the hydraulic pressure of operation fluid supplied into clutch housing 66 causes piston 70 to slide along PTO clutch input shaft 61 against spring 69, friction discs 68 are pressed against one another so as to engage PTO clutch 41, i.e., so as to drivingly connect PTO clutch input shaft 61 to PTO clutch output gear 67. When the operation fluid is released from clutch housing 66, vice versa, PTO clutch 41 is thereby disengaged.

A PTO counter shaft 71 and rear PTO shaft 24 are extended parallel to PTO clutch input shaft 61. Rear wall portion 39b of transaxle housing 39 journals a rear end portion of PTO counter shaft 71 and an axial intermediate portion of rear PTO shaft 24 via respective bearings. A gear 72 is fixed on PTO counter shaft 71 and meshes with PTO clutch output gear 67. A gear 73 is fixed on PTO counter shaft 71 and meshes with a gear 74 fixed on rear PTO shaft 24. Gear 72 is diametrically larger than PTO clutch output gear 67, and gear 74 is diametrically larger than gear 73, so that gears 67, 72, 73 and 74 constitute reduction gear train 42 interposed between PTO clutch 41 and rear PTO shaft 24.

A sub speed control drive shaft 62 and a sub speed control driven shaft 63 are extended fore-and-aft horizontally and are journalled at respective front end portions thereof by front wall cover 39a of transaxle housing 39 via respective bearings, and are journalled at respective rear end portions thereof by a middle wall portion 39c formed in transaxle housing 39 via respective bearings. The above-mentioned rear end portion of motor shaft 45a is coupled to the front end portion of sub speed control drive shaft 62 via a coupling sleeve 65 so as to be rotatably integral with sub speed control drive shaft 62.

Gears 75 and 76 are fixed on sub speed control drive shaft 62. Gears 77 and 78 are fitted on sub speed control driven shaft 63 rotatably relative to sub speed control driven shaft 63. Gears 75 and 77 mesh with each other so as to constitute the low speed gear train of sub speed control unit 43. Gears 76 and 78 mesh with each other so as constitute the high speed gear train of sub speed control unit 43. A spline hub 79 is fixed on sub speed control driven shaft 63 between gears 77 and 78. Gears 77 and 78 are formed with respective clutch teeth 77a and 78a on respective axial boss portions thereof facing spline hub 79. A shifter 80 engaged to a fork 81 is axially slidably fitted on spline hub 79 unrotatably relative to spline hub 79.

Shifter 80 is shiftable among a low speed position Lo, a neutral position N and a high speed position Hi. Shifter 80 set at low speed position Lo engages with clutch teeth 77a so as to drivingly connect gears 75 and 77 serving as the low speed gear train to sub speed control driven shaft 63. Shifter 80 set at high speed position Hi engages with clutch teeth 78a so as to drivingly connect gears 76 and 78 serving as the high speed gear train to sub speed control driven shaft 63. When shifter 80 is set at neutral position N between low and high speed positions Lo and Hi, shifter 80 disengages from clutch teeth 77a and 78a so as to isolate sub speed control driven shaft 63 from the rotations of the low and high speed gear trains.

Figure 4:
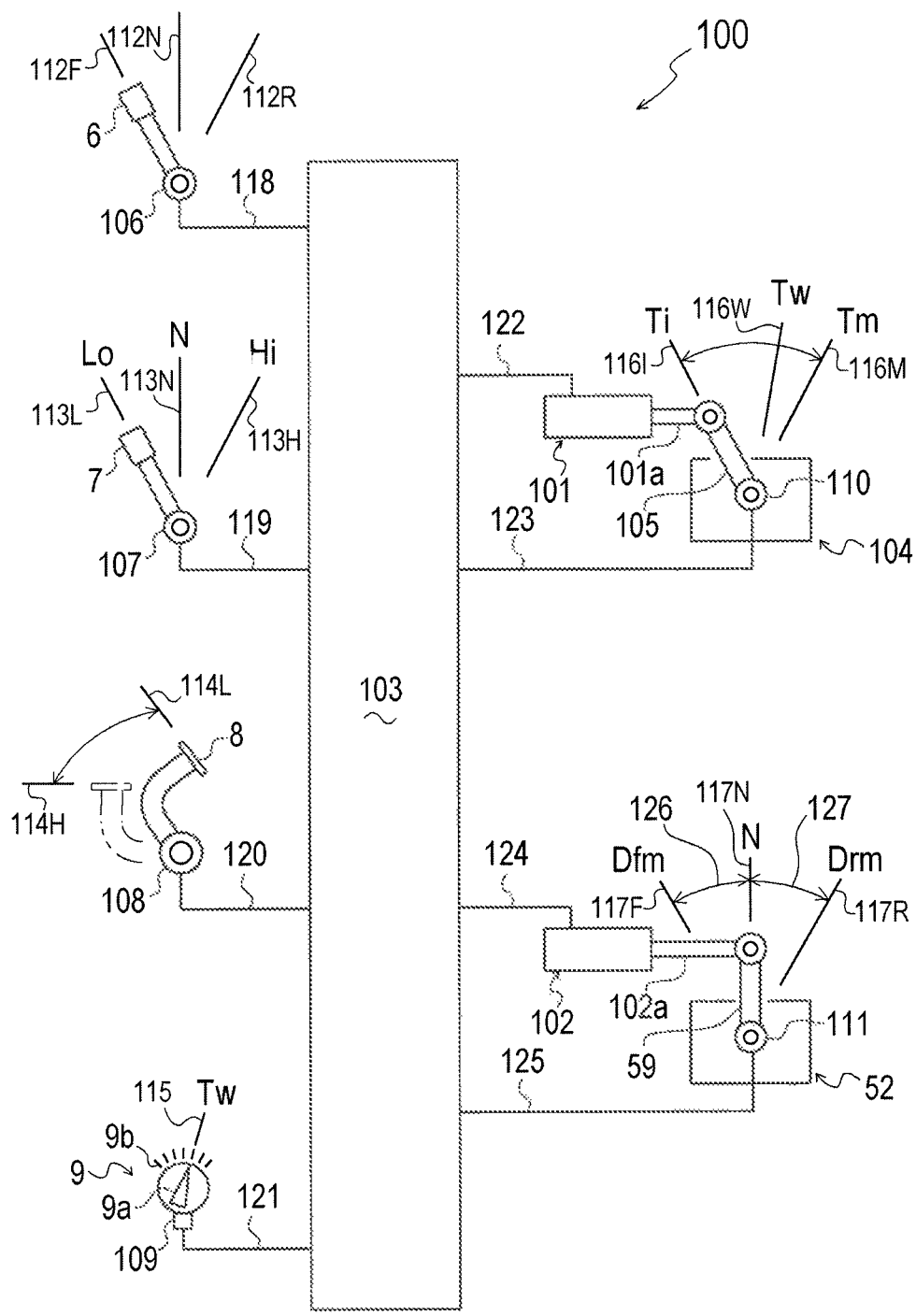
FIG. 4 is a block diagram of a vehicle speed control system 100.

Fork 81 engaging with shifter 80 is interlockingly connected to travel mode setting lever 7 serving as the sub speed control manipulator. Referring to FIG. 4, as discussed later, a work travel mode position 113L of lever 7 corresponds to low speed position Lo of shifter 80, a normal travel mode position 113H of lever 7 to high speed position Hi of shifter 80, and a neutral position 113N of lever 7 to neutral position N of shifter 80. A mechanical linkage is interposed between fork 81 and lever 7. Alternatively, referring to FIG. 4, a later-discussed controller 103 may read a signal from a sensor 107 detecting a position of lever 7 and may control an electrically controlled actuator to change the position of fork 81 and shifter 80 to correspond to the detected position of lever 7.

A rear end portion of sub speed control driven shaft 63 projects rearward from middle wall portion 39c in transaxle housing 39 and is formed thereon with a bevel pinion 86. In transaxle housing 39, the differential unit that differentially connects proximal ends of right and left axles 19 to each other includes a bevel ring gear 87 meshing with bevel pinion 86 so as to receive the output power of sub speed control unit 43, thereby differentially driving axles 19 of right and left rear wheels 21.

A clutch input shaft 84 is extended parallel to sub speed control driven shaft 63 and is journalled by front wall cover 39a via a bearing. In transaxle housing 39, a gear 82 is fixed on sub speed control driven shaft 63, a gear 83 is fixed on clutch input shaft 84, and gears 82 and 83 mesh with each other so as to constitute a gear train transmitting power from sub speed control driven shaft 63 to clutch input shaft 84.

A front end portion of clutch input shaft 84 projects forward from front wall cover 39a and is fixedly provided thereon with a clutch teeth sleeve 84a. A front PTO housing 40a journals front PTO shaft 22 via a bearing and is fixed at a rear end thereof onto front wall cover 39a. The projecting front end portion of clutch input shaft 84 is inserted into a rear end portion of front PTO shaft 22 so that clutch input shaft 84 and front PTO shaft 22 are disposed coaxially to each other. A clutch shifter 85 is axially slidably fitted on the rear end portion of front PTO shaft 22. Clutch input shaft 84, front PTO shaft 22, clutch shifter 85, and front PTO housing 40a incorporating shafts 84 and 22 and clutch shifter 85 constitute front PTO unit 40 disposed on the lower front portion of transaxle 15 below HST 16.

Clutch shifter 85 is shiftable between a clutch off position as a 2WD (2 wheel drive) position and a clutch on position as a 4WD (4 wheel drive) position. Clutch shifter 85 set at the 2WD position is separated from clutch teeth formed on clutch teeth sleeve 84a so as to isolate front PTO shaft 22 from the rotation of clutch input shaft 84 receiving the rotation of sub control driven shaft 63, thereby realizing a 2WD mode of vehicle 1 where vehicle 1 travels by driving only rear wheels 21. Clutch shifter 85 set at the 4WD position meshes with the clutch teeth formed on clutch teeth sleeve 84a so as to transmit the rotation of clutch input shaft 84 to front PTO shaft 22, thereby realizing a 4WD mode of vehicle 1 where vehicle 1 travels by driving front and rear wheels 20 and 21.

Figure 3:
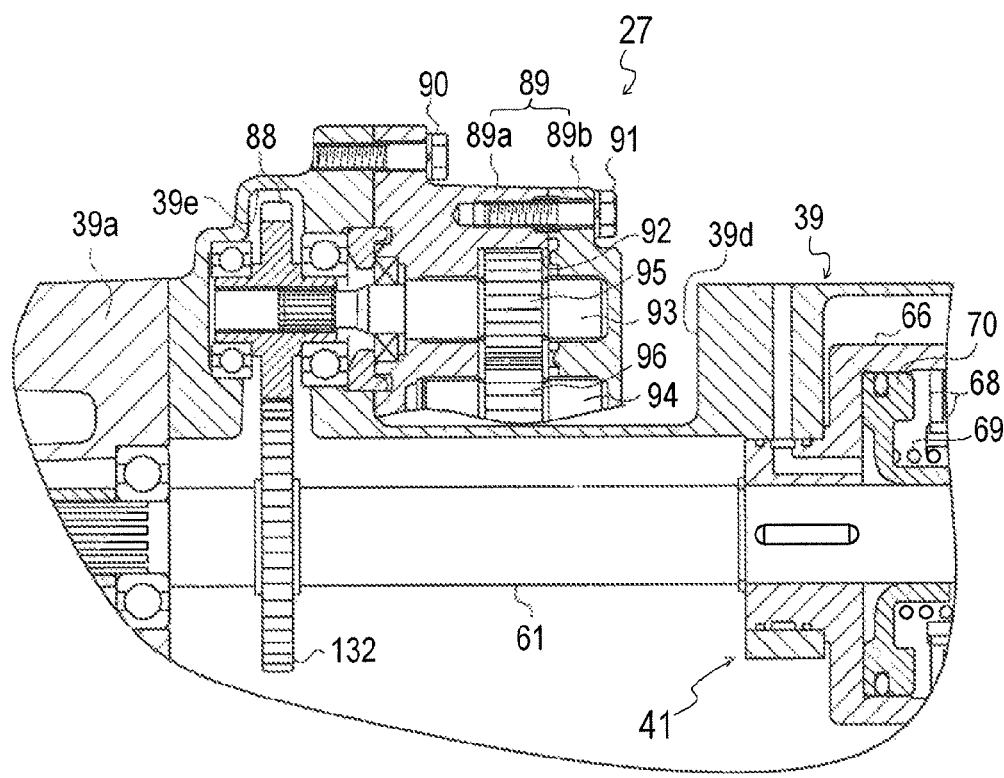
FIG. 3 is an enlarged fragmentary sectional view of the transaxle showing a PTO hydraulic pump.

As shown in FIG. 3, an outwardly open recess 39d for accommodating front PTO hydraulic pump unit 27 is formed in a sidewall portion of transaxle housing 39. In this embodiment, recess 39d is formed in a representative upper front left side portion of transaxle housing 39. An inwardly open recess serving as a gear chamber 39e is formed in a sidewall portion of transaxle housing 39 defining a front wall of recess 39d. A pump drive shaft 93 is extended parallel to PTO clutch input shaft 61 and is journalled by the sidewall portion defining gear chamber 39e via bearings. In gear chamber 39e, a gear 88 is fixed on the front portion of pump dive shaft 93 and meshes with a gear 132 fixed on PTO clutch input shaft 61

A rear portion of pump drive shaft 93 projects rearward from the sidewall portion of transaxle housing 39 defining the front wall of recess 39d. A front divisional housing 89a is disposed in recess 39d and is fastened to the sidewall portion of transaxle housing 39 defining the front wall of recess 39d by bolts 90 so as to journal the rear portion of pump drive shaft 93 therein. A pump driven shaft 94 is extended parallel to pump drive shaft 93 and is journalled in front divisional housing 89*a*. A pump gear 95 fixed on pump drive shaft 93 and a pump gear 96 fixed on pump driven shaft 94 are disposed in front divisional housing 89*a* and mesh with each other so as to constitute a gear pump of front PTO hydraulic pump unit 27. A rear divisional housing 89*b* is disposed in recess 39*d* and is fastened to a rear end of front divisional housing 89*a* via bolts 91 so as to cover rear ends of pump drive and driven shafts 93 and 94 and so as to journal the rear ends of shafts 93 and 94. Front and rear divisional housings 89*a* and 89*b* joined to each other constitute a pump housing 89 of front PTO hydraulic pump unit 27.

The rotation of PTO clutch input shaft 61 is taken off to pump drive shaft 93 via gears 132 and 88 so as to drive pump gears 95 and 96 serving as the hydraulic pump of front PTO hydraulic pump unit 27. In this embodiment, front PTO hydraulic pump unit 27 is configured to deliver fluid to hydraulic motor 30 for driving pest control pump 31 of pest control machine 3.

As shown in FIG. 2, rear PTO hydraulic pump unit 28 is mounted onto rear wall portion 39*b* of transaxle housing 39. Rear PTO hydraulic pump unit 28 has a forwardly projecting input shaft 97 that is disposed in a hole formed in rear wall portion 39*b* and is fixedly fitted into the rear end portion of PTO clutch input, shaft 61 journalled by rear wall portion 39*b*. Therefore, the rotation of PTO clutch input shaft 61 that is free from whether PTO clutch 41 is clutched on or off is taken off to rear PTO hydraulic pump unit 28. A typical hydraulic pump of rear PTO hydraulic pump unit 28 is a gear pump similar to that of front PTO hydraulic pump unit 27. In this embodiment, the hydraulic pump of rear PTO hydraulic pump unit 28 serves as a charge, pump for supplying fluid to hydraulic pump 44 of HST 16.

Alternatively, front PTO hydraulic pump unit 27 may serve as the charge pump, for HST 16 and rear PTO hydraulic pump unit 28 may serve as a hydraulic pump for driving a work device such as pest control machine 3. Alternatively, transaxle 15 may be provided with only front or rear PTO hydraulic pump unit 27 or 28 serving as the charge pump for HST 16 or serving as both the charge pump for HST 16 and the hydraulic pump for the work device such as pest control machine 3. In the case where only one of pump units 27 and 28 is provided on transaxle housing 39, pump unit 27 or 28 may include two hydraulic pumps so that one hydraulic pump may serve as the charge pump for HST 16 and the other hydraulic pump may serve as the hydraulic pump for driving a hydraulically driven work device such as pest control machine 3.

In this way, vehicle 1 is provided with front and rear PTO hydraulic pump units 27 and 28 serving as a hydraulic PTO device for driving a hydraulically driven work device such as pest control machine 3 as well as rear PTO shaft 24 serving as a mechanical PTO device for a mechanically driven work device such as cultivator 2, thereby enabling it to simultaneously drive both mechanically and hydraulically driven work devices.

Figure 5A:
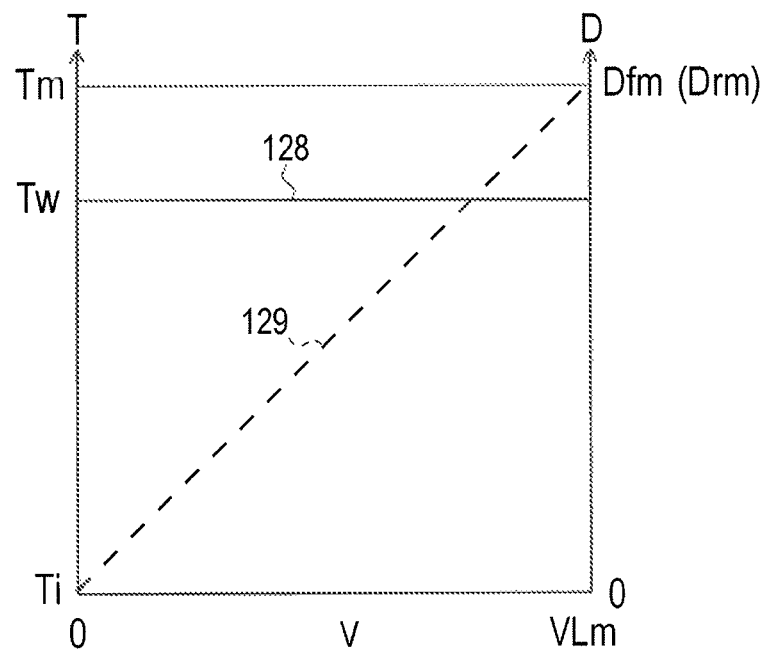
FIG. 5(a) is a work travel mode map for vehicle speed control system 100.
Figure 5B:
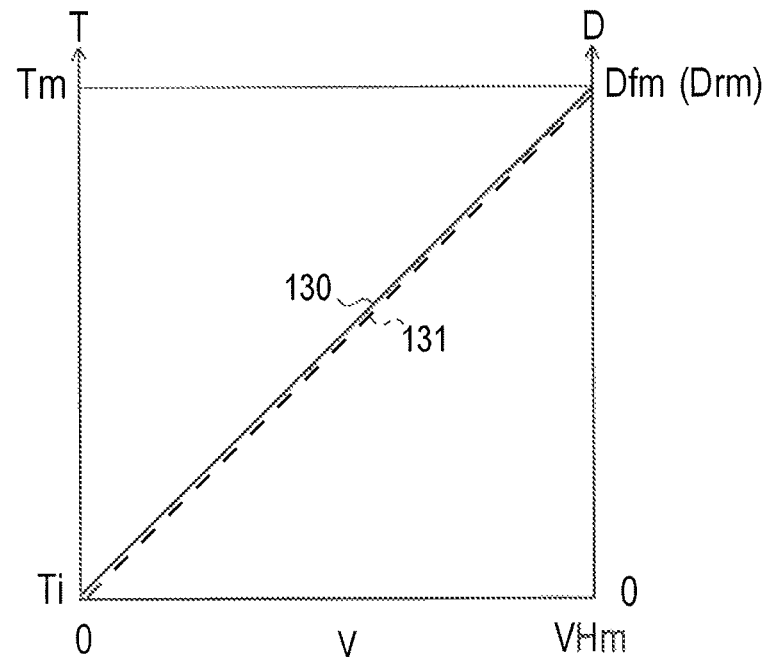
FIG. 5(b) is a normal travel mode map for vehicle speed control system 100.
Figure 6:
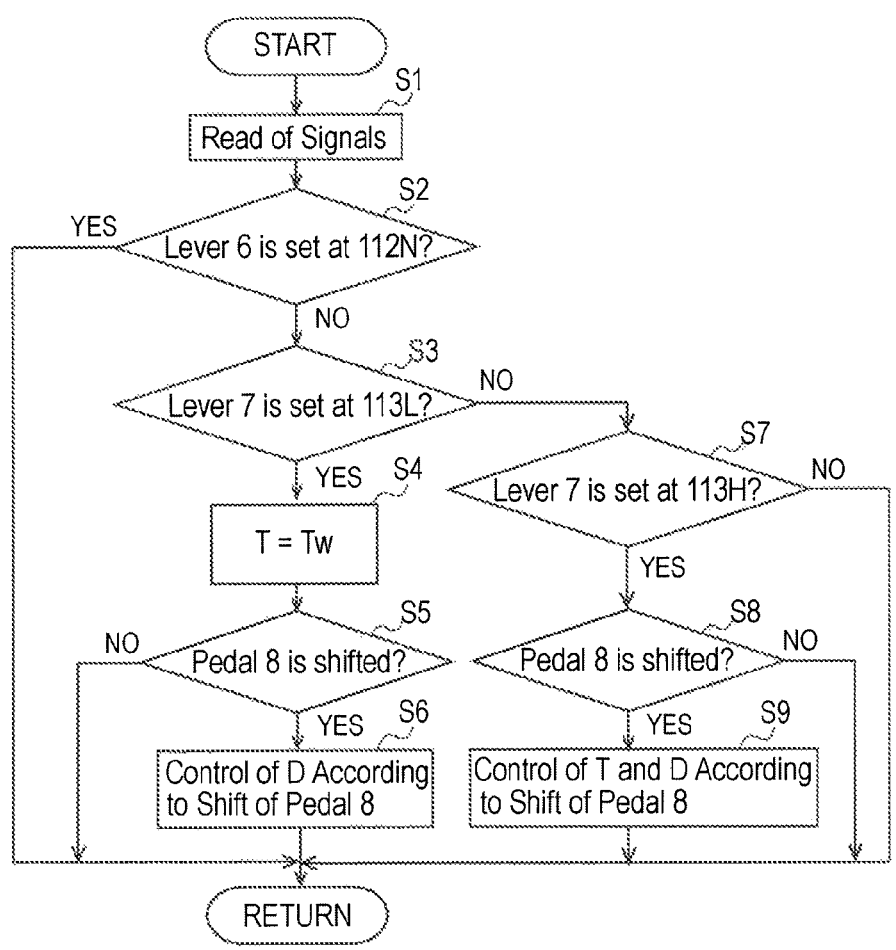
FIG. 6 is a flow chart of engine and HST control by vehicle speed control system 100.

Referring to FIGS. 4 to 6, vehicle 1 employs a vehicle speed control system 100 for controlling engine 14 and transaxle 15 as a representative traveling speed control system for a work vehicle according to the invention. More specifically, vehicle speed control system 100 controls a rotary speed of engine 14 and an output/input speed ratio of HST 16 serving as the main speed control unit of transaxle 15 in correspondence to the setting of vehicle speed by depressing accelerator pedal 8 and in correspondence to the setting of sub speed control unit 43 of transaxle 15. Further, the control of rotary speed of engine 14 is realized by controlling a throttle opening of a throttle 104 of engine 14, and the control of output/input speed ratio of HST 16 is realized by controlling a tilt angle of movable swash plate 49 of hydraulic pump 44 of HST 16.

As shown in FIG. 4, traveling speed control system 100 includes a controller 103 and sensors 106, 107 108 and 109 electrically connected to controller 103 via respective signal lines 118, 119, 120 and 121. Sensor 106 detects a set position of reverser lever 6. Sensor 107 detects a set position of travel mode setting lever 7. Sensor 108 detects a position (depression degree) of accelerator pedal 8. Sensor 109 detects a set point of throttle setting dial 9.

Engine 14 includes throttle 104 whose opening is controlled according to rotation of a throttle control lever 105 pivoted on engine 14. An electrically controlled cylinder serving, as an actuator 101 for rotating throttle control lever 105 is electrically connected to controller 103 via a signal line 122. Actuator 101 has a telescopically movable rod 101*a* connected to throttle control lever 105. Throttle 104 is provided with a sensor 110 for detecting a position of throttle control lever 105, thereby detecting an actual throttle opening of throttle 104. Sensor 110 is electrically connected to controller 103 via a signal line 123.

As mentioned above, HST 16 of transaxle 15 includes HST control lever 59 operatively connected to movable swash plate 49 of hydraulic pump 44 via hydraulic servo unit 52. An electrically controlled cylinder serving as an actuator 102 for rotating HST control lever 59 is electrically connected to controller 103 via a signal line 124. Actuator 102 has a telescopically movable rod 102*a* connected to HST control lever 59. HST 16 is provided with a sensor 111 for detecting a position of HST control lever 59, thereby detecting an actual tilt angle of movable swash plate 49. Sensor 111 is electrically connected to controller 103 via a signal line 125.

Reverser lever 6 is shiftable among a forward traveling position 112F, a neutral position 112N and a backward traveling position 112R. Accelerator pedal 8 can be depressed from an initial position 114L (of undepressed accelerator pedal 8) for zeroing the traveling speed of vehicle 1 to a maximum speed position 114H (of most depressed accelerator pedal 8) for maximizing the traveling speed of vehicle 1. The traveling speed of vehicle 1 is referred to as vehicle speed V.

Movable swash plate 49 is provided with a neutral position and a forward traveling rotation range and a backward traveling rotation range opposite each other with respect to the neutral position. A neural position 117N of HST control lever 59 corresponds to the neutral position of movable swash plate 49 where the tilt angle of swash plate 49 is zero. The tilt angle of movable swash plate 49 from its neutral position in either the forward or backward traveling, rotation range is referred to as swash plate angle D. A forward traveling, rotation range 126 for rotation of HST control lever 59 from neutral, position 117N to a maximum forward traveling speed position 117F corresponds to the forward traveling rotation range of movable swash plate 49 to increase swash plate angle D from 0 to a maximum forward traveling speed angle Dfm. A backward traveling rotation range 127 for rotation of HST control lever 59 from neutral position 117N to a maximum backward traveling speed position 117R corresponds to the backward traveling rotation range of movable swash plate 49 to increase swash plate angle D from 0 to a maximum backward traveling speed angle Drm.

More specifically, the output/input speed ratio of HST 16 is the rotary speed ratio of motor shaft 45*a* to pump shaft 44*a*. The increase of output/input speed ratio of HST 16 is substantially proportional to the increase of swash plate angle D from 0 to either maximum forward or backward traveling speed angle Dfm or Drm. The later-discussed increase rate of swash plate angle D is also substantially proportional to the increase rate of output/input ratio of HST 16. Therefore, the later-discussed control of HST 16 by controlling swash plate angle D is described on the assumption that variation of swash plate angle D represents variation of output/input speed ratio of HST 16.

Controller 103 commands actuator 102 to telescopically move rod 102a so as to set HST control lever 59 at a position corresponding to detection signals from sensors 106 and 108 detecting positions of reverser lever 6 and accelerator pedal 8, and monitors a position of HST control lever 59 based on a detection signal from sensor 111, thereby controlling swash plate angle D in either the forward or backward traveling rotation range.

When reverser lever 6 is set at neutral position 112N or accelerator pedal 8 is set at initial position 114L, HST control lever 59 is set at neutral position 117N so as to zero swash plate angle D. When reverser lever 6 is set at forward traveling position 112F, as accelerator pedal 8 is depressed from initial position 114L to maximum speed position 114H, HST control lever 59 is rotated from neutral position 117N to maximum forward traveling speed position 117F so as to increase swash plate angle D from 0 to maximum forward traveling speed angle Dfm. When reverser lever 6 is set at backward traveling position 112R, as accelerator pedal 8 is depressed from initial position 114L to maximum speed position 114H, HST control lever 59 is rotated from neutral position 117N to maximum backward traveling speed position 117R so as to increase swash plate angle D from 0 to maximum backward traveling speed angle Drm.

Throttle setting dial 9 is provided with a pointer 9a and graduations 9b. Any one of graduations 9b pointed by pointer 9a is referred to as a set point 115 of throttle setting dial 9, the opening degree of throttle 104 is referred to as throttle opening T, and throttle opening T corresponding to set point 115 is referred to as a work throttle opening Tw. Throttle opening T is variable between a minimum throttle opening Ti corresponding to the idling speed of engine 14 and a maximum throttle opening Tm corresponding to the maximum rotary speed of engine 14. Throttle control lever 105 is rotatable between a minimum throttle opening position 116I corresponding to minimum throttle opening Ti and a maximum throttle opening position 116M corresponding to maximum throttle opening Tm.

Controller 103 commands actuator 101 to telescopically move rod 101a so as to set throttle control lever 105 at a position corresponding to either a detection signal from sensor 108 detecting the depression position of accelerator pedal 8 or a detection signal from sensor 109 detecting set point 115 of throttle setting dial 9, and monitors the position of throttle control lever 105 based on a detection signal from sensor 110, thereby realizing either work throttle opening Tw or throttle opening T corresponding to the depression position of accelerator pedal 8.

Whether throttle control lever 105 is controlled based on the detection signal from sensor 108 or the detection signal from sensor 109 depends on whether travel mode setting lever 7 is set to realize a work travel mode or a normal travel mode. In this regard, travel mode setting lever 7 is shiftable among a work travel mode position 113L, a neutral position 113N and a normal travel mode position 113H. Work travel mode position 113L is also referred to as a low speed level position corresponding to low speed position Lo of shifter 80 of sub speed control unit 43 in transaxle 15. Normal travel mode position 113H is also referred to as a high speed level position corresponding to high speed position Hi of shifter 80 of sub speed control unit 43. Neutral position 113N of travel mode setting lever 7 corresponds to neutral position N of shifter 80.

Alternatively, travel mode setting lever 7 may not have neutral position 113N for setting shifter 80 at neutral position N, i.e., travel mode setting lever 7 may be shiftable between only work travel mode position 113L and normal travel mode position 113H so as to make shifter 80 between only low and high speed positions Lo or Hi because reverser lever 6 or accelerator pedal 8 can be operated to set HST 16 in the neutral state.

Controller 103 checks the detection signal from sensor 107 so as to judge whether travel mode setting lever 7 is set at work travel mode position 113L or normal travel mode position 113H so that controller 103 controls the position of shifter 80 and fork 81 in correspondence to the set position of travel mode setting lever 7 and decides whether the control of actuator 101 for controlling throttle opening T should rely on the detection signal from sensor 108 or the detection signal from sensor 109.

If travel mode setting lever 7 is set at work travel mode position 113L, controller 103 controls actuators 101 and 102 so as to realize a work travel mode map of FIG. 5(a) indicating a throttle opening characteristic line 128 and a swash plate angle characteristic line 129. In this regard, throttle control lever 105 is set at a position 116W corresponding to set point 115 of dial 9 before vehicle 1 starts traveling, i.e., while vehicle 1 is stationary. The depression of accelerator pedal 8 from initial position 114L to maximum speed position 114H causes only movement of HST control lever 59 for increasing swash plate angle D from 0 to maximum forward or backward traveling speed angle Dfm or Drm, thereby increasing vehicle speed V from 0 to a maximum speed VLm in the work travel mode. Work throttle opening Tw is kept constant while vehicle speed V increases from 0 to maximum speed VLm. In other words, the work travel mode is a control of engine 14 and HST 16 such that the opening degree of throttle 104 of engine 14 is fixed at work throttle opening Tw during idling of engine 14 prior to the start of traveling of vehicle I and increase of vehicle speed V by moving swash plate 49 of hydraulic pump 44 of HST 16 from its neutral position. Incidentally, the phrase "during idling of engine 14" means the stationary condition of vehicle 1 with engine 14 rotating regardless of the rotary speed of engine 14. On the other hand, the above-mentioned "idling speed" corresponding to minimum throttle opening Ti means the minimum rotary speed of engine 14 required for idling engine 14.

If travel mode setting lever 7 is set at normal travel mode position 113H, controller 103 controls actuators 101 and 102 so as to realize a normal travel mode map shown in FIG. 5(b) indicating a throttle opening characteristic line 130 and a swash plate position characteristic line 131. In this regard, when accelerator pedal 8 is disposed at initial position 114L, throttle control lever 105 is set at minimum throttle opening position 116I so as to idle engine 14 and HST control lever 59 is set at neutral position 117N so as to set HST 16 in neutral, thereby zeroing vehicle speed V. As accelerator pedal 8 is depressed from initial position 114L to maximum speed position 114H, throttle control lever 105 is proportionally rotated from minimum throttle opening position 116I to maximum throttle opening position 116M and simultaneously HST control lever 59 is proportionally rotated from neutral position 117N to maximum forward or backward traveling speed position 117E or 117R. In other words, the depression of accelerator pedal 8 from initial position 114L to maximum speed position 114H causes both movement of throttle control lever 105 for increasing throttle opening T from minimum throttle opening Ti to maximum throttle opening Tm and movement of HST control lever 59 for increasing swash plate angle D from 0 to maximum forward or backward traveling speed angle Dfm or Drm, thereby increasing vehicle speed V from 0 to a maximum speed VHm in the normal travel mode.

A flow chart of engine and HST control by vehicle speed control system 100 as shown in FIG. 6 will be described. When a starter for starting-up engine 14 is turned on, controller 103 receives the detection signals from sensors 106, 107, 108, 109, 110 and 111 via respective signal lines 118, 119, 120, 121, 123 and 125 and performs a step S1 that is reading what the detection signals are. Controller 103 checks the detection signal from sensor 106 so as to perform a step S2 that is judgment whether reverser lever 6 is set at neutral position N or not. If reverser lever 6 is not set at neutral position 112N, i.e., if reverser lever 6 is set at forward traveling position 112F or backward traveling position 112R, controller 103 checks the detection signal from sensor 107 so as to perform a step S3 that is judgment whether travel mode setting lever 7 is set at work travel mode position 113L or not.

If travel mode setting lever 7 is set at work travel mode position 113L, controller 103 performs a step S4 referred to as "T=Tw". In step S4, controller 103 reads target work throttle opening Tw based on the detection signal from sensor 109 indicating set point 115 of throttle setting dial 9, monitors actual throttle opening T based on the detection signal from sensor 110 indicating the actual position of throttle control lever 105, and commands actuator 101 to set throttle control lever 105 at work throttle opening position 116W so as to set throttle opening T of throttle 104 at work throttle opening Tw, thereby driving engine 14 at a speed corresponding to work throttle opening Tw. Therefore, throttle opening T of throttle 104 is increased to work throttle opening Tw during idling of engine 14 before vehicle 1 starts traveling by depressing accelerator pedal 8.

Then, controller 103 checks the detection signal from sensor 108 so as to perform a step S5 that is judgment whether accelerator pedal 8 is shifted, i.e., whether accelerator pedal 8 has any change of its depression degree. The shift of accelerator pedal 8, i.e., the change of depression degree of accelerator pedal 8 includes the change of depression degree of pedal 8 from 0 for starting travel of vehicle 1, and includes the change of depression degree of pedal 8 during travel of vehicle 1 for changing vehicle speed V. In other words, the judgment of step S5 means whether accelerator pedal 8 is depressed for start of vehicle 1, i.e., whether accelerator pedal 8 is not held at initial position 114L, and after the depression of accelerator pedal 8 for start of vehicle 1 is recognized, the judgment of step S5 means whether accelerator pedal 8 is shifted to another depression degree for changing vehicle speed V.

If accelerator pedal 8 is recognized to have a change of its depression degree, controller 103 performs a step S6 that is automatic control of swash plate angle D according to the shift change of depression degree) of accelerator pedal 8. In step S6, controller 103 leads the detection signal from sensor 108 to decide a target swash plate angle corresponding to the depression position of accelerator pedal 8, monitors actual swash plate angle D based on the detection signal from sensor 111 indicating the actual position of HST control lever 59, and commands actuator 102 to shift HST control lever 59 to a target position so as to shift the tilt angle of swash plate 49 to the target angle, thereby starting travel of vehicle 1 or changing vehicle speed V during travel of vehicle 1.

As a result, during travel of vehicle 1 set in the work travel mode by setting shifter 80 of sub speed control unit 43 at low speed position Lo, opening T of throttle 104 of engine 14 is fixed at the set point of throttle setting dial 9 as represented by characteristic line 128 in the map of FIG. 5(*a*), and target vehicle speed V determined by depressing accelerator pedal 8 is realized by controlling angle D of swash plate 49 of HST 16. As represented by characteristic line 129 in the map of FIG. 5(*a*), the increase of swash plate angle D is proportional to increase of vehicle speed V because the increase rate of swash plate angle D to increase of depression degree of accelerator pedal 8 is constant.

The description is returned to step S3. In step S3, if travel mode setting lever 7 is not set at work travel mode position 113L, controller 103 further checks the detection signal from sensor 107 so as to perform a step S7 that is judgment whether travel mode setting lever 7 is set at normal travel mode position 113H or not. If travel mode setting lever 7 is set at normal travel mode position 113H, controller 103 checks the detection signal from sensor 108 so as to perform a step S8 that is judgment whether accelerator pedal 8 is shifted similar to the judgment of step S5. If accelerator pedal 8 is recognized as being depressed for starting travel of vehicle 1 or as being shifted to a different depression degree during travel of vehicle 1 for changing vehicle speed V, controller 103 performs a step S9 that is automatic control of throttle opening T and swash plate angle D according to the shift (i.e., change of depression degree) of accelerator pedal 8. In step S9, controller 103 reads the detection signal from sensor 108 to decide a target throttle opening and a target swash plate position corresponding to the depression position of accelerator pedal 8, monitors actual throttle opening T and actual swash plate angle D based on the detection signals from sensors 110 and 111 indicating the actual positions of throttle control, lever 105 and HST control lever 59, and commands actuators 101 and 102 to shift throttle control lever 105 and HST control lever 59 at respective target positions so as to shift throttle opening T of throttle 104 to the target opening and so as to shift swash plate angle D of swash plate 49 to the target angle.

As a result, during travel of vehicle 1 set in the normal travel mode by setting shifter 80 of sub speed control unit 43 at high speed position Hi, target vehicle speed V determined by depressing accelerator pedal 8 is realized by controlling opening T of throttle 104 of engine 14 and angle D of swash plate 49 of HST 16 as represented by characteristic lines 130 and 131 in the map of FIG. 5(*b*). The increase of throttle opening T and the increase of swash plate angle D are proportional to increase of vehicle speed V as represented by respective characteristic lines 130 and 131 because the increase rate of throttle opening T to increase of depression degree of accelerator pedal 8 and the increase rate of swash plate angle D to increase of depression degree of accelerator pedal 8 are constant.

Alternative vehicle speed control systems 100A and 100B will be described with reference to FIGS. 7 to 12. Description of component elements designated by the same reference numerals as those designating the corresponding component elements of vehicle speed control system 100 will be omitted except for special cases because they are identical or similar to the corresponding component elements of vehicle speed control system 100.

Figure 7:
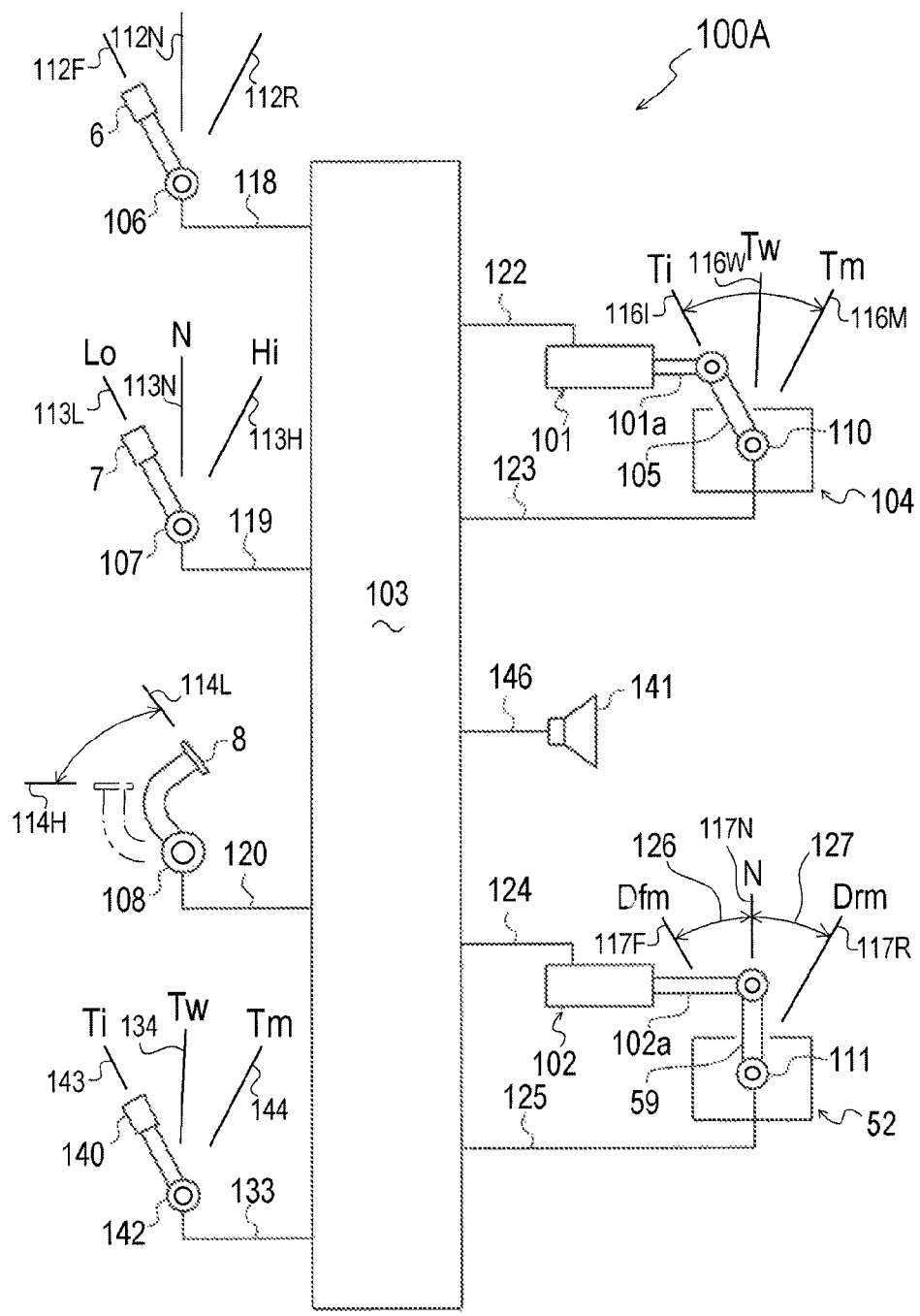
FIG. 7 is a block diagram of a vehicle speed control system 100A.
Figure 8A:
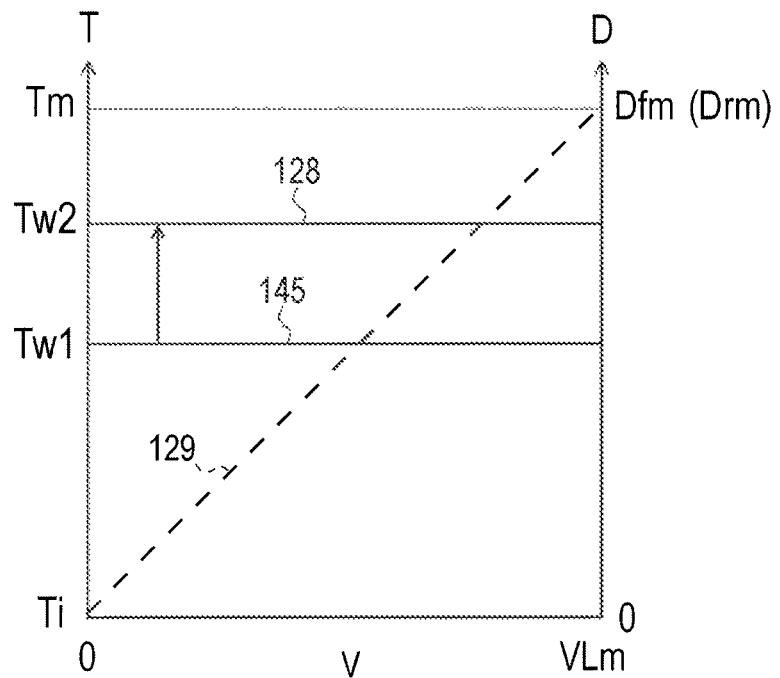
FIG. 8(a) is a work travel mode map for vehicle speed control system 100A.
Figure 8B:
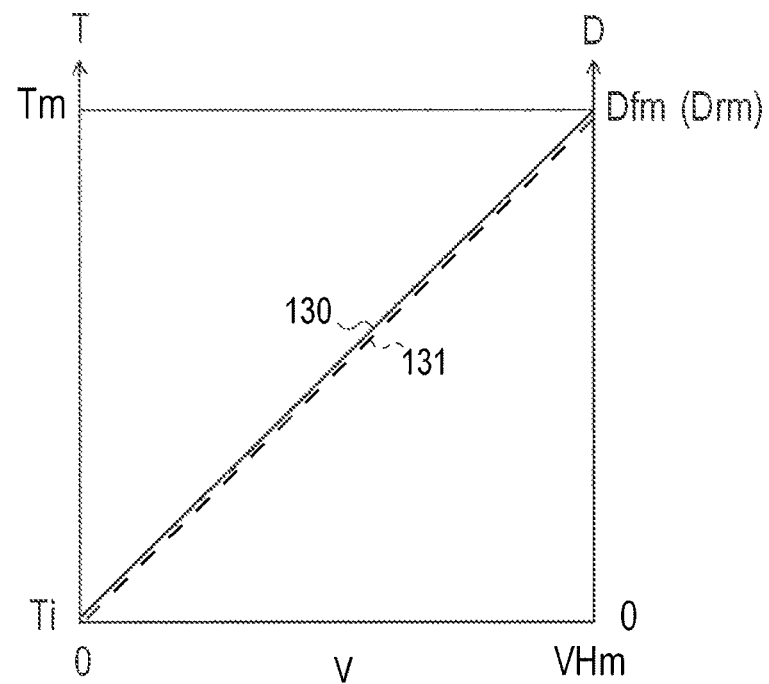
FIG. 8(b) is a normal travel mode map for vehicle speed control system 100A.
Figure 9:
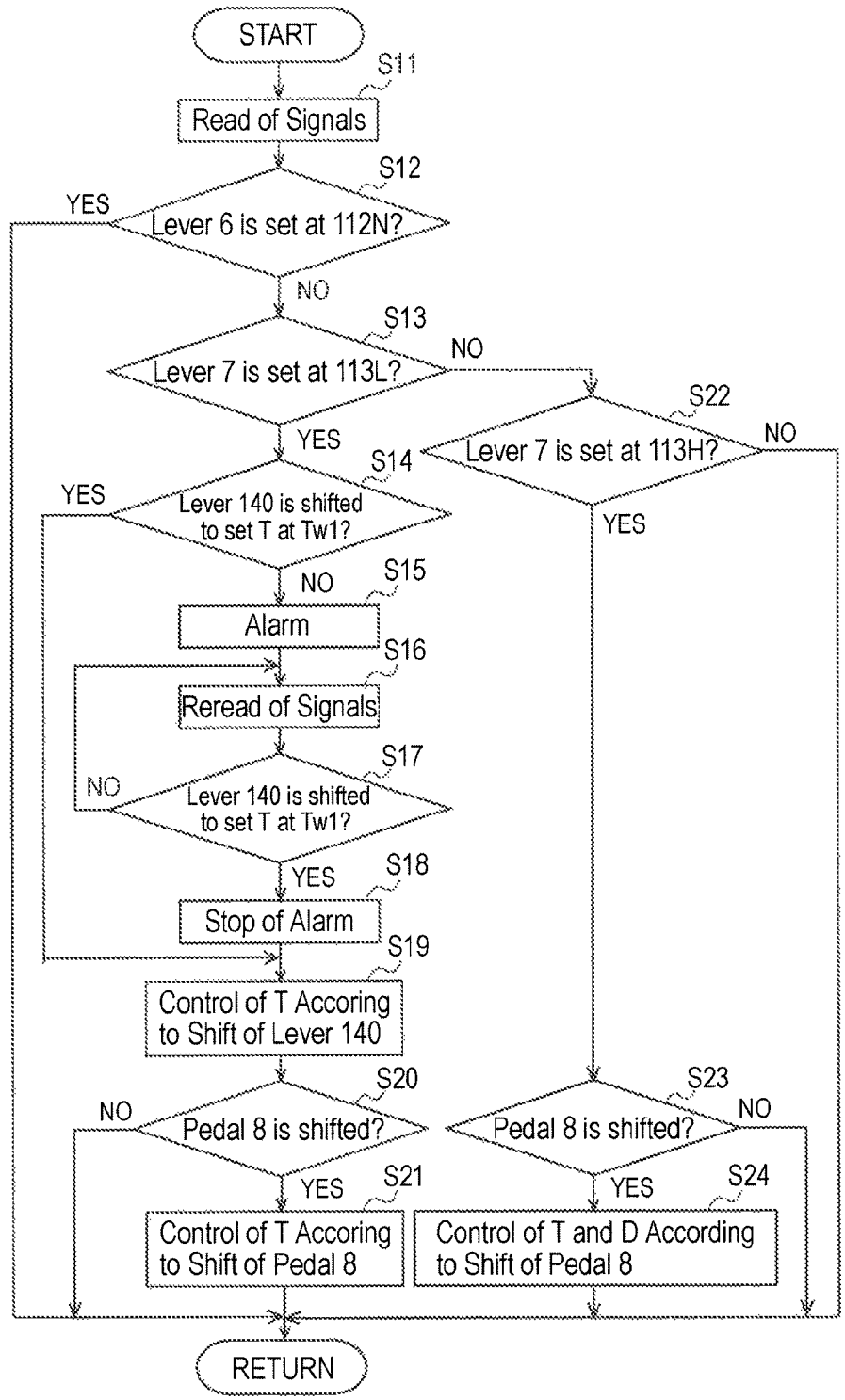
FIG. 9 is a flow chart of engine and HST control by vehicle speed control system 100A.

Referring to FIGS. 7 to 9, vehicle speed control system 100A is provided with a throttle setting lever 140 serving as a throttle setting manipulator instead of throttle setting dial 9. Vehicle speed control system 100A is further provided with an alarm 141 for alarming an operator that throttle setting lever 140 has not been manipulated to set a target throttle opening T in the work travel mode.

Throttle setting lever 140 is rotatable between a minimum throttle opening position 143 corresponding to minimum throttle opening Ti and a maximum throttle opening position 144 corresponding to maximum throttle opening Tm. Throttle setting lever. 140 is provided with a sensor 142 electrically connected to controller 103 via a signal line 133. While vehicle 1 is stationary, an operator can set throttle setting lever 140 at any position 134 between minimum and maximum throttle opening positions 143 and 144 so as to select any work throttle opening Tw referred to as a work throttle opening Tw1 set before travel of vehicle 1. Also, during travel of vehicle 1, the operator can manually shift throttle setting lever 140 to another position so as to change target work throttle opening Tw such as change of work throttle opening Tw1 set before travel of vehicle 1 to another work throttle opening TW2.

In this regard, a work travel mode map of FIG. 8(a) indicates a shift of work throttle opening Tw1 optionally set before travel of vehicle 1 to another work throttle opening Tw2 optionally set during travel of vehicle 1. Work travel mode map of FIG. 8(a) and a normal travel mode map of FIG. 8(b) representing the engine and HST control by vehicle speed control system 100A are identical to the maps of FIGS. 5(a) and 5(b) except that work travel mode map of FIG. 8(a) indicates the shift of a work throttle opening characteristic line 145 to another work throttle opening characteristic line 128. Work throttle opening characteristic lines 145 and 128 represent respective work throttle openings Tw1 and TW2 kept constant in the entire variation range of vehicle speed V.

Alarm 141 is electrically connected to controller 103 via a signal line 146. Alarm 141 typically generates alarming sound. Alternatively, any alarming means, e.g., a light or a vibrator may serve as alarm 141. In the condition that the work travel mode is set by travel mode setting lever 7, if throttle setting lever 140 is not set at any position 134 corresponding to any work throttle opening Tw1 before travel of vehicle 1, i.e., if throttle opening lever 140 is held at minimum throttle opening position 143 for idling engine 14, alarm 141 alarms an operator to manipulate throttle setting lever 140 for setting any work throttle opening Tw1 before travel of vehicle 1.

Alternatively, a threshold of work throttle opening Tw1 set before travel of vehicle 1 may be predetermined. In this case, if position 134 of throttle setting lever 140 optionally set before travel of vehicle 1 corresponds to throttle opening Tw that is smaller than the threshold of work throttle opening Tw1 to be set before travel of vehicle 1, alarm 141 alarms an operator to manually shift throttle setting lever 140 to another optional position 134 corresponding to any work throttle opening Tw1 that is not smaller than the threshold. Therefore, vehicle 1 is prevented from starting to travel with wrong throttle work opening Tw that is inappropriate for travel of vehicle 1 set in the work travel mode.

The flow chart of engine and HST control by vehicle speed control system 100A as shown in FIG. 9 will be described. Description of steps S11, S12 and S13 is omitted because they are the same as corresponding steps S1, S2 and S3 of the flow chart of FIG. 6 except that in step S11 controller 103 receives a detection signal from sensor 142 instead of sensor 109. These steps S11, S12 and S13 are performed while engine 14 idles and vehicle 1 is stationary.

If controller 103 in step S13 judges that travel mode setting lever 7 is set at work travel mode position 113L, controller 103 checks the detection signal from sensor 142 indicating a position of throttle setting lever 140 so as to perform a step S14 that is judgment whether throttle setting lever 140 is manipulated to set any work throttle opening Tw1 to be set before travel of vehicle 1, i.e., whether throttle setting lever 140 is not held at minimum throttle opening position 143, or whether optional set position 134 of throttle setting lever 140 corresponds to throttle opening T that is not smaller than the threshold of work throttle opening Tw1 to be set before travel of vehicle 1.

If throttle setting lever 140 is not manipulated to set any work throttle opening Tw1 to be set before travel of vehicle 1, i.e., if throttle setting lever 140 is held at minimum throttle opening position 143, or whether optional set position 134 of throttle setting lever 140 corresponds to throttle opening T that is smaller than the threshold of work throttle opening Tw1 to be set before travel of vehicle 1, controller 103 performs a step S15 that is command for alarm 141 to sound the alarm. Once alarm 141 sounds the alarm, alarm 141 does not stop sounding unless a later step S18 is performed.

Then, controller 103 performs a step S16 that is rereading of the detection signals and performs a step S17 that is repeat of judgment whether throttle setting lever 140 is manipulated to set any work throttle opening Tw1 to be set before travel of vehicle 1. Rereading of the detection signals as step S16 is repeated unless controller 103 in step S17 recognizes that throttle setting lever 140 is manipulated to set any work throttle opening Tw1. If controller 103 in step S17 recognizes that throttle setting lever 140 is manipulated to set any work throttle opening Tw serving as work throttle opening Tw1 set before travel of vehicle 1, controller 103 performs step S18 that is command for alarm 141 to stop sounding.

If controller 103 recognizes in either step S14 or S17 that throttle setting lever 140 is manipulated to set work throttle opening Tw1 and recognizes in step S18 that alarm 141 does not sound or has stopped sounding, controller 103 performs a step S19 that is control of opening T of throttle 104 according to the set position of throttle setting lever 140. This throttle control of step S19 includes a throttle control before travel of vehicle 1 and a throttle control during travel of vehicle 1. The throttle control before travel of vehicle 1 is a command of controller 103 for actuator 101 to set throttle control lever 105 at work throttle opening position 116W so as to realize work throttle opening Tw1 of throttle 104 before vehicle 1 starts traveling. The throttle control during travel of vehicle 1 is a command of controller 103 for actuator 101 to change throttle opening T of throttle 104 from work throttle opening Tw1 to another work throttle opening Tw2 if an operator on vehicle 1 while traveling feels some problem caused by a wrong work throttle opening Tw1 of throttle 104 set before travel of vehicle 1 and manipulates throttle setting lever 140 to set throttle 104 at a correct work throttle opening Tw2.

Controller 103 also checks the detection signal from sensor 108 so as to perform a step S20 that is judgment whether accelerator pedal 8 is shifted. The meaning of the shift of accelerator pedal 8 to be judged in step S20 is the same as those in steps S5 and S8 of the flow chart of FIG. 6. If a shift (i.e., change of depression degree) of accelerator pedal 8 is recognized, controller 103 performs a step S21 that is control of swash plate angle D according to the shift of accelerator pedal 8. Similar to step S6 of the flow chart of FIG. 6, the swash plate angle control of step S21 is the command of controller 103 for actuator 102 to set HST control lever 59 at a position corresponding to the depression degree of accelerator pedal 8, thereby realizing vehicle speed V pointed as the depression degree of accelerator pedal 8. In this way, the flow of steps S19, S20 and S21 by vehicle speed control system 100A is the same as that of steps S4, S5 and S6 by vehicle speed control system 100.

Step S22 as judgment whether travel mode setting lever 7 is set at normal travel mode position 113H, step S23 as judgment whether accelerator pedal 8 is shifted, and step S24 as control of throttle opening T and swash plate angle D according to shift of accelerator pedal 8 are the same as steps S7, S8 and S9 of the flow chart of FIG. 6 performed by vehicle speed control system 100, respectively.

Figure 10:
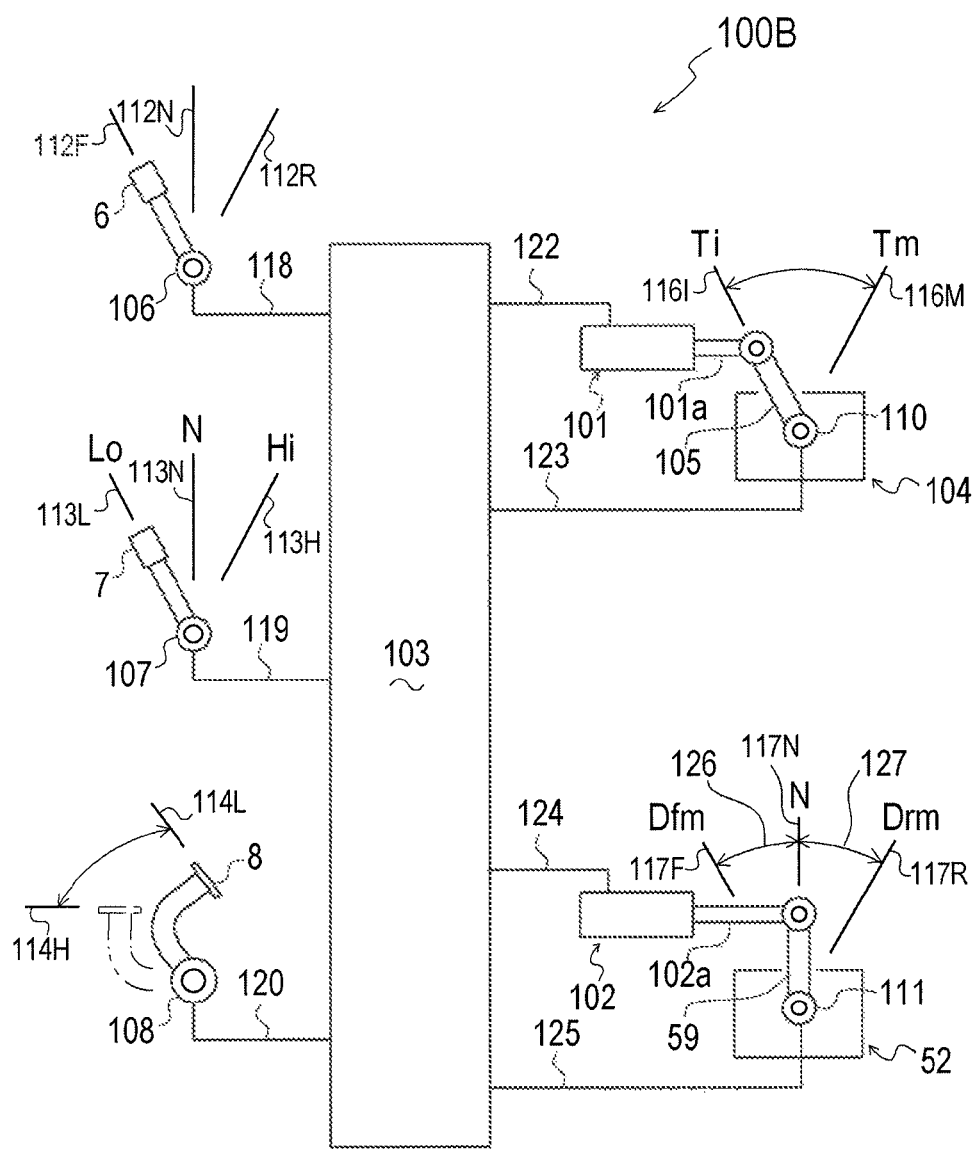
FIG. 10 is a block diagram of a vehicle speed control system 100B.

Referring to FIG. 10, vehicle speed control system 100B is the same as vehicle speed control system 100 as shown in FIG. 4 except that throttle setting dial 9 with sensor 109 electrically connected to controller 103 via signal line 121 is omitted.

Figure 11A:
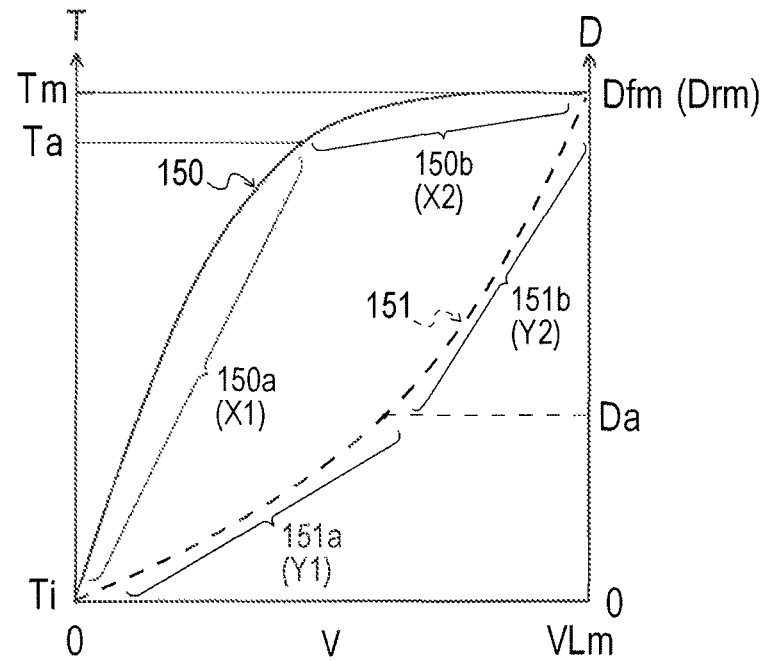
FIG. 11(a) is a work travel mode map for vehicle speed control system 100B.
Figure 11B:
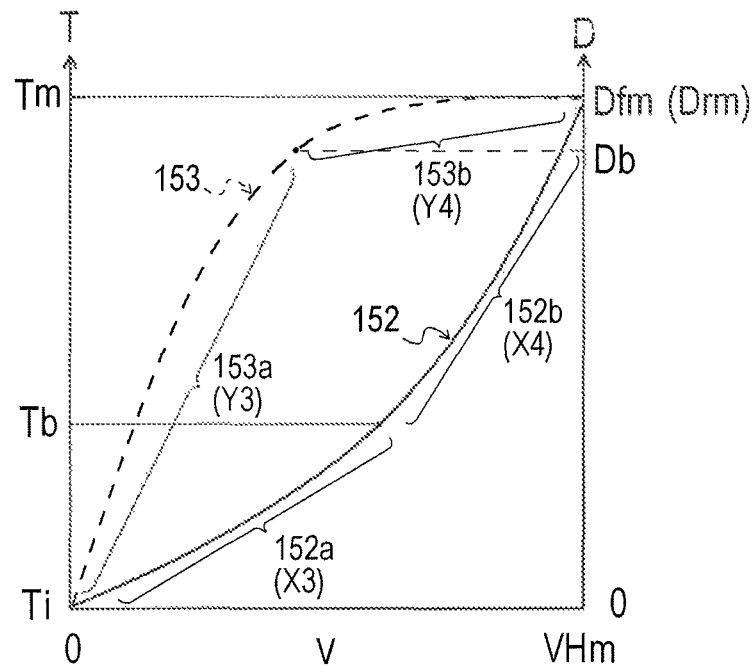
FIG. 11(b) is a normal travel mode map for vehicle speed control system 100B.

Referring to FIGS. 11(a) and 11(b), neither increase of throttle opening T nor increase of swash plate angle D is constant relative to increase of vehicle speed V, i.e., increase of depression degree of accelerator pedal 8 in either the work travel mode or the normal travel mode. In other words, the increase rates of throttle opening T and swash plate angle D are changed as accelerator pedal 8 is depressed from initial position 114L to maximum speed position 114H. This is the significant difference from vehicle speed control systems 100 and 100A with the constant increase rates of throttle opening T and swash plate angle D regardless of the depression degree of accelerator pedal 8.

In this regard, the engine and HST control by vehicle speed control system 100B is performed so that either throttle opening T or swash plate angle D is preferentially increased in an early stage of depression of accelerator pedal 8 from initial position 114L for increasing vehicle speed V from 0 so as to reduce load on engine 14 or HST 16. Whether the increase of throttle opening T or the increase of swash plate angle D is prioritized depends on whether the work travel mode or the normal travel mode is selected. A work travel mode map of FIG. 11(a) indicates an upwardly curved throttle opening characteristic line 150 and a downwardly curved swash plate angle characteristic line 151, thereby meaning that the increase of throttle opening T is prioritized against the increase of swash plate angle D in the early stage of increasing vehicle speed V. On the other hand, a normal travel mode map shown in FIG. 11(b) indicates a downwardly curved throttle opening characteristic line 152 and an upwardly curved swash plate angle characteristic line 153, thereby meaning the increase of swash plate angle D is prioritized against the increase of throttle opening T in the early stage of increasing vehicle speed V.

Referring to the work travel mode map of FIG. 11(a), throttle opening characteristic line 150 represents increase of throttle opening T from minimum throttle opening Ti to maximum throttle opening Tm according to increase of vehicle speed V from 0 to maximum VLm. Throttle opening characteristic line 150 is divided by a reference point corresponding to a reference throttle opening Ta into a steeply sloped first part 150a and a gently sloped second, part 150b. As discussed later, an increase rate of reference throttle opening Ta according to increase of vehicle speed V becomes the average of all increase rates of all throttle openings T in the entire range of vehicle speed V from 0 to maximum VLm, i.e., in the all range of depression degree of accelerator pedal 8 from initial position 114L to maximum speed position 114H.

First part 150a represents increase of throttle opening T from minimum throttle opening Ti to reference throttle opening Ta according to increase of vehicle speed V from 0 to an intermediate speed. In first part 150a, at start of increase of vehicle speed V from 0, i.e., at start of depression of accelerator pedal 8 from initial position 114L, throttle opening T is increased from minimum throttle opening Ti by the maximum increase rate. This starting increase of throttle opening T is represented as the almost vertical left end of line 150 at the zero point of vehicle speed V. As vehicle speed V is increased, i.e., as the depression degree of accelerator pedal 8 is increased, the increase rate of throttle opening T is reduced. The reduction of increase rate of throttle opening T is represented as the curve of line 150. The increase rate of each throttle opening T on first part 150a of line 150 is larger than the increase rate of reference throttle opening Ta. Therefore, the curve of first part 150a is steep (close to a vertical line). An average increase rate X1 is the average of these increase rates of all throttle openings T on first part 150a in the first range of vehicle speed V from 0 to the intermediate speed corresponding to reference throttle opening Ta. The increase rate of throttle opening T reduced according to increase of vehicle speed V becomes the average of all increase rates of throttle openings in the entire range of vehicle speed V when increased vehicle speed V becomes the intermediate speed corresponding to reference throttle opening Ta.

Second part 150b represents increase of throttle opening T from reference throttle opening Ta to maximum throttle opening Tm according to increase of vehicle speed V from the intermediate speed to maximum speed VLm. In second pan 150b, as vehicle speed V is increased from the intermediate speed, i.e., as the depression degree of accelerator pedal 8 is increased from the depression degree corresponding to the intermediate speed of vehicle speed V, the increase rate of throttle opening T is reduced. The increase rate of each throttle opening T on second part 150b of line 150 is smaller than the increase rate of reference throttle opening Ta. Therefore, the rate of reduction of increase rate of throttle opening T is also reduced. As a result, the curve of second part 150b is gentle (close to a horizontal line). An average increase rate X2 is the average of these increase rates of all throttle openings T on second part 150b in the second range of vehicle speed V from the intermediate speed to maximum speed VLm. The reduced increase rate of throttle opening T finally becomes 0 when increased vehicle speed V becomes maximum VLm and increased throttle opening T becomes maximum Tm.

Further, referring to the work travel mode map of FIG. 11(a), swash plate angle characteristic line 151 represents increase of swash plate angle D from 0 to maximum Dfm or Drm according to increase of vehicle speed V from 0 to maximum VLm. Throttle opening characteristic line 151 is divided by a reference point corresponding to a reference swash plate angle Da into a gently sloped first part 151a and a steeply sloped second part 151b. As discussed later, an increase rate of reference swash plate angle Da according to increase of vehicle speed V becomes the average of all increase rates of all swash plate angles T in the entire range of vehicle speed V from 0 to maximum VLm, i.e., in the all range of depression degree of accelerator pedal 8 from initial position 114L to maximum speed position 114H.

First part 151a represents increase of swash plate angle D from 0 to reference angle Da according to increase of vehicle speed V from 0 to an intermediate speed. In first part 151a, at start of increase of vehicle speed V from 0, i.e., at start of depression of accelerator pedal 8 from initial position 114L, swash plate angle D is increased from 0 by the minimum increase rate while throttle opening T is increased from minimum throttle opening Ti by the maximum increase rate. This starting increase of swash plate angle D is represented as the almost horizontal left end part of line 151 at the zero point of vehicle speed V. As vehicle speed V is increased, i.e., as the depression degree of accelerator pedal 8 is increased, the increase rate of swash plate angle D is increased while the increase rate of throttle opening T is reduced. The increase of increase rate of swash plate angle D is represented as the curve of line 151. The increase rate of each swash plate angle D on first part 151a of line 151 is smaller than the increase rate of reference swash plate angle Da. Therefore, the curve of first part 151a is gentle (close to a horizontal line). An average increase rate Y1 is the average of these increase rates of all swash plate angles D on first part 150a in the first range of vehicle speed V from 0 to the intermediate speed corresponding to reference throttle opening Ta. The increase rate of swash plate angle D reduced according to increase of vehicle speed V becomes the average of all increase rates of throttle openings in the entire range of vehicle speed V when increased vehicle speed V becomes the intermediate speed corresponding to reference swash plate angle Da.

Second part 151b represents increase of swash plate angle D from reference swash plate angle Da to maximum angle Dfm of Drm according to increase of vehicle speed V from the intermediate speed to maximum speed VLm. In second part 150b, as vehicle speed V is increased from the intermediate speed, i.e., as the depression degree of accelerator pedal 8 is increased from the depression degree corresponding to the intermediate speed of vehicle speed V, the increase rate of swash plate angle D is increased. The increase rate of each swash plate angle D on second part 150b of line 150 is larger than the increase rate of reference swash plate angle Da. Therefore, the rate of increase of increase rate of throttle opening T is also increased. As a result, the curve of second part 150b is steep (close to a vertical line). An average increase rate Y2 is the average of these increase rates of all swash plate angles D on second part 151b in the second range of vehicle speed V from the intermediate speed to maximum speed VLm. The increased increase rate of throttle opening T finally becomes the maximum when increased vehicle speed V becomes maximum VLm and increased swash plate angle D becomes maximum Dfm or Drm.

As a result, in the work travel mode, the early stage of increase of vehicle speed V, i.e., the acceleration of vehicle 1 in the early stage from start of vehicle 1 is realized by the large increase rate of throttle opening T (represented by the large average increase rate X1) and by the small increase rate of swash plate angle D (represented by the small average increase rate Y1), so that the increase of torque of engine 14 is prioritized before the increase of output/input speed ratio of HST 16, thereby preventing lack of engine torque for start of vehicle 1 with heavy load in the work travel mode.

On the other hand, referring to the normal travel mode map of FIG. 11(b), throttle opening characteristic line 152 represents increase of throttle opening T from minimum Ti to maximum Tm according to increase of vehicle speed V from 0 to maximum VHm, and swash plate angle characteristic line 153 represents increase of swash plate angle D from 0 to maximum Dfm or Drm according to increase of vehicle speed V from 0 to maximum VHm. A reference point corresponding to a reference throttle opening Tb divides throttle opening characteristic line 152 into a gently sloped first part 152a and a steeply sloped second part 152b. A reference point corresponding to a reference swash plate angle Db divides swash plate angle characteristic line 153 into a steeply sloped first part 153a and a gently sloped second part 153b.

The increase rate of throttle opening T is increased as throttle opening T is increased according to increase of vehicle speed V so that the increase rate of throttle opening T becomes minimum when vehicle speed V is zero, and becomes maximum when vehicle speed V is at the maximum VHm. The increase rate of reference throttle opening Tb is the average of all increase rates of throttle openings in the entire range of vehicle speed V from 0 to maximum VHm. On the other hand, the increase rate of swash plate angle D is reduced as swash plate angle D is increased according to increase of vehicle speed V so that the increase rate of swash plate angle D becomes maximum when vehicle speed V is zero, and becomes minimum when vehicle speed V is at the maximum VHm. The increase rate of reference swash plate angle Db is the average of all increase rates of swash plate angles in the entire range of vehicle speed V from 0 to maximum VHm.

In the first range of increase of vehicle speed V from 0 to an intermediate speed corresponding to reference throttle opening Tb, throttle opening T is increased by small increase rates represented by an average increase rate X3 that is smaller than the increase rate of reference throttle opening Tb, while in the first range of increase of vehicle speed V from 0 to an intermediate speed corresponding to reference swash plate angle Db, swash plate angle D is increased by large increase rates represented by an average increase rate Y3 that is larger than the increase rate of reference swash plate angle Db. On the other hand in the second range of increase of vehicle speed V from the intermediate speed corresponding to reference throttle opening Tb to maximum VHm, throttle opening T is increased by large increase rates represented by an average increase rate X4 that is larger than the increase rate of reference throttle opening Tb, while in the second range of increase of vehicle speed V from the intermediate speed corresponding to reference swash plate angle Db to maximum swash plate angle D is increased by small increase rates represented by an average increase rate Y4 that is smaller than the increase rate of reference swash plate angle Db.

As a result, in the normal travel mode, the early stage of increase of vehicle speed V, i.e., the acceleration of vehicle 1 in the early stage from start of vehicle 1 is realized by the small increase rate of throttle opening T (represented by the small average increase rate X3) and by the large increase rate of swash plate angle D (represented by the large average increase rate Y3), so that the increase of output/input speed ratio of HST 16 is prioritized against the increase of torque of engine 14, hereby preventing waste consumption of fuel for driving engine to start traveling of vehicle 1 in the normal travel mode.

Figure 12:
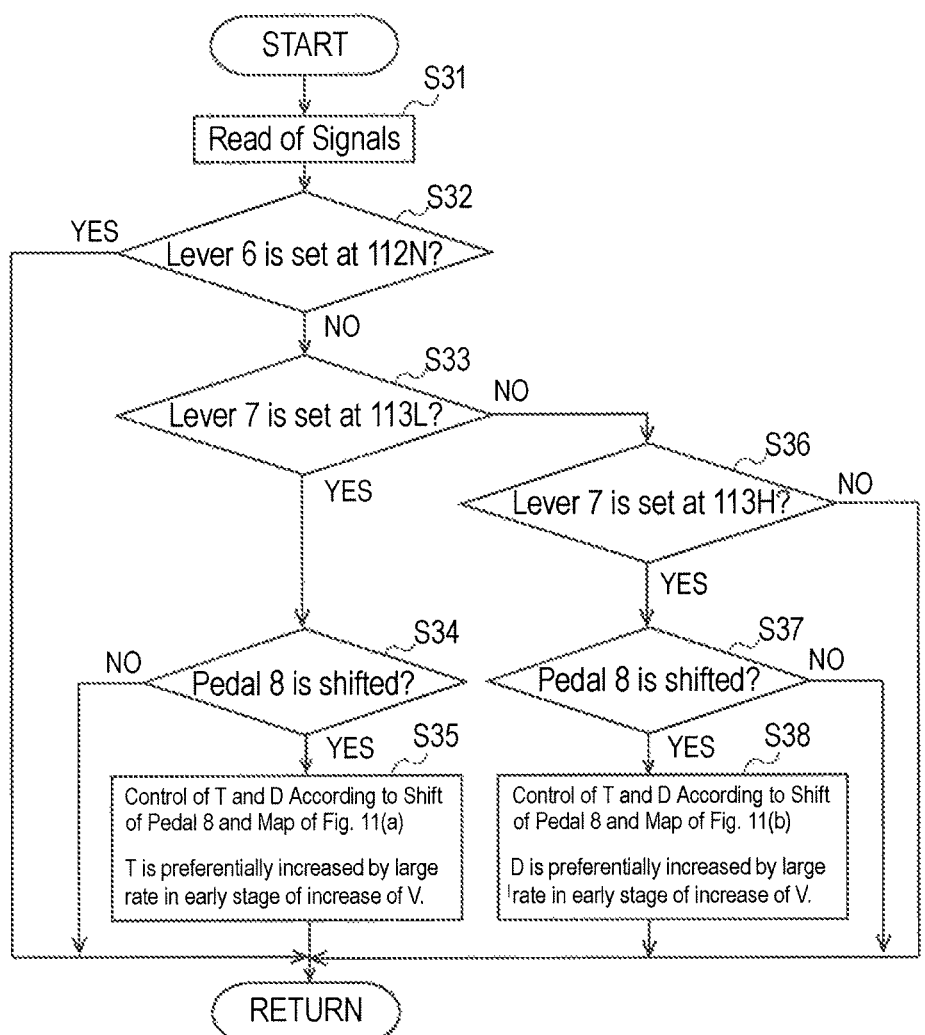
FIG. 12 is a flow chart of engine and HST control by vehicle speed control system 100B.

The flow chart of engine and HST control by vehicle speed control system 100B as shown in FIG. 12 will be described. Description of steps S31, S32, S33 and S36 is omitted because they are the same as corresponding steps S1, S2, S3 and S7 of the flow chart of FIG. 6 except that in step S31, there is no sensor 109 issuing a detection signal to be received by controller 103. These steps S31, S32, S33 and S36 are performed while engine 14 idles and vehicle 1 is stationary.

If controller 103 in step S33 judges that travel mode setting lever 7 is set at work travel mode position 113L, controller 103 checks the detection signal from sensor 108 so as to perform a step S34 that is judgment whether accelerator pedal 8 is shifted (i.e., whether accelerator pedal 8 is depressed from initial position 114L or whether the depression degree of accelerator pedal 8 is changed to change vehicle speed V). If accelerator pedal 8 is shifted, controller 103 performs a step S35 that is control of throttle opening T and swash plate D according to the shift of accelerator pedal 8 and to the work travel mode map of FIG. 11(a). In step S35, controller 103 reads the detection signal from sensor 108 to decide a target throttle opening and a target swash plate position corresponding to the depression position of accelerator pedal 8, monitors actual throttle opening T and actual swash plate angle D based on the detection signals from sensors 110 and 111 indicating the actual positions of throttle control lever 105 and HST control lever 59, and commands:actuators 101 and 102 to set throttle control lever 105 and HST control lever 59 at respective target positions so as to realize characteristic lines 150 and 151 of throttle opening T and swash plate angle D as expressed in the work travel mode map of FIG. 11(a) during increase of vehicle speed V from 0 to maximum VLm.

If controller 103 in step S36 judges that travel mode setting lever 7 is set at normal travel mode position 113H, controller 103 checks the detection signal from, sensor 108 so as to perform a step S37 that is judgment whether accelerator pedal 8 is shifted. If accelerator pedal 8 is shifted, controller 103 performs a step S38 that is control of throttle opening T and swash plate angle D according to the shift of accelerator pedal 8 and according to the normal travel mode map of FIG. 11(b). In step S37, controller 103 reads the detection signal from sensor 108 to decide a target throttle opening and a target swash plate position corresponding to the depression position of accelerator pedal 8, monitors actual throttle opening T and actual swash plate angle D based on the detection signals from sensors 110 and 111 indicating the actual positions of throttle control lever 105 and HST control lever 59, and commands actuators 101 and 102 to set throttle control lever 105 and HST control lever 59 at respective target positions so as to realize characteristic lines 152 and 153 of throttle opening T and swash plate angle D as expressed in the normal travel mode map of FIG. 11(b) during increase of vehicle speed V from 0 to maximum VHm.

In the above description, each of the points on the respective characteristic lines in the maps of FIGS. 11(a) and 11(b) corresponding to reference throttle openings Ta and Tb and reference swash plate angles Da and Db is defined as a point corresponding to the average of all increase ratios of throttle openings T or swash plate angles D in the entire range of vehicle speed V. However, this is only an example. The throttle openings T and swash plate angles D that should be defined as reference throttle openings Ta and Tb and reference swash plate angles Da and Db depend on the reason why the points divide the characteristic lines into the first and second parts. One suggested reason for dividing each characteristic line into the first part of small vehicle speed range and the second part of large vehicle speed range is to make a difference of change rate of the increase rate of throttle opening T or swash plate angle D relative to increase of vehicle speed V between the first part and the second part. The, dividing of the characteristic line into the first and second parts by the reference throttle opening or the reference swash plate angle has little significance if the change rate of the increase rate of throttle opening T or swash plate angle D is even in the entire range of vehicle speed V, for example.

Various adaptations or modifications can be provided for the above-mentioned control of throttle opening T and swash plate angle D for controlling vehicle speed V by any of vehicle speed control system 100 of FIGS. 4 to 6, vehicle speed control system 100A of FIGS. 7 to 9 and vehicle speed control, system 100B of FIGS. 10 to 12. In this regard, ultimately, any of these controls can serve as the control of engine rotary speed and HST output/input speed ratio for controlling the vehicle traveling speed. Therefore, it is sufficient if in each of the maps of FIGS. 5(a), 5(b), 8(a), 8(b), 11(a) and 11(b), one vertical axis indicates variation of rotary speed of engine 14 (from the idling speed to the maximum speed) and another vertical axis indicates variation of output/input speed ratio of HST 16 from 0 to the maximum). In other words, the only requirement of the vehicle speed control performed by vehicle speed control system 100 or 100A in the normal travel mode is to increase the rotary speed of engine 14 and the output/input speed ratio of HST 16 proportionally to increase of vehicle speed V from 0 to maximum VHm, and the only requirements of the same in the work travel mode are to increase the rotary speed of engine 14 to a certain rotary speed above the idling speed (i.e., the minimum rotary speed required for idling, engine 14) during idling of engine 14 before travel of vehicle 1, to keep the certain rotary speed of engine 14 during travel of vehicle 1 (unless the certain rotary speed is change by manipulating lever 140 if it is performed by vehicle speed control system 100A), and to increase the output/input speed ratio of HST 16 in correspondence to increase of vehicle speed V from 0 to maximum VLm. If engine 14 is a diesel engine, the fuel injection control may replace the control of throttle opening T for controlling the engine rotary speed. In this case, the vertical axis of each map indicates variation of fuel injection amount so as to represent the variation of the rotary speed of engine 14.

Further, in some cases, the change of swash plate angle D from 0 to maximum Dfm or Drm may be incongruous to change of vehicle speed V from 0 to the maximum. For example, if the HST is assembled in a hydraulic-mechanical transmission (HMT), swash plate angle D may be reduced from maximum backward traveling speed angle Drm to 0 and then increased from 0 to maximum forward traveling speed angle Dfm in correspondence to increase of vehicle speed V from 0 to the maximum. In such a case, the vertical axis of each map may indicate variation of swash plate angle D from Drm to Dfm via 0 so as to represent the variation of output/input speed ratio of HST 16.

Figure 13:
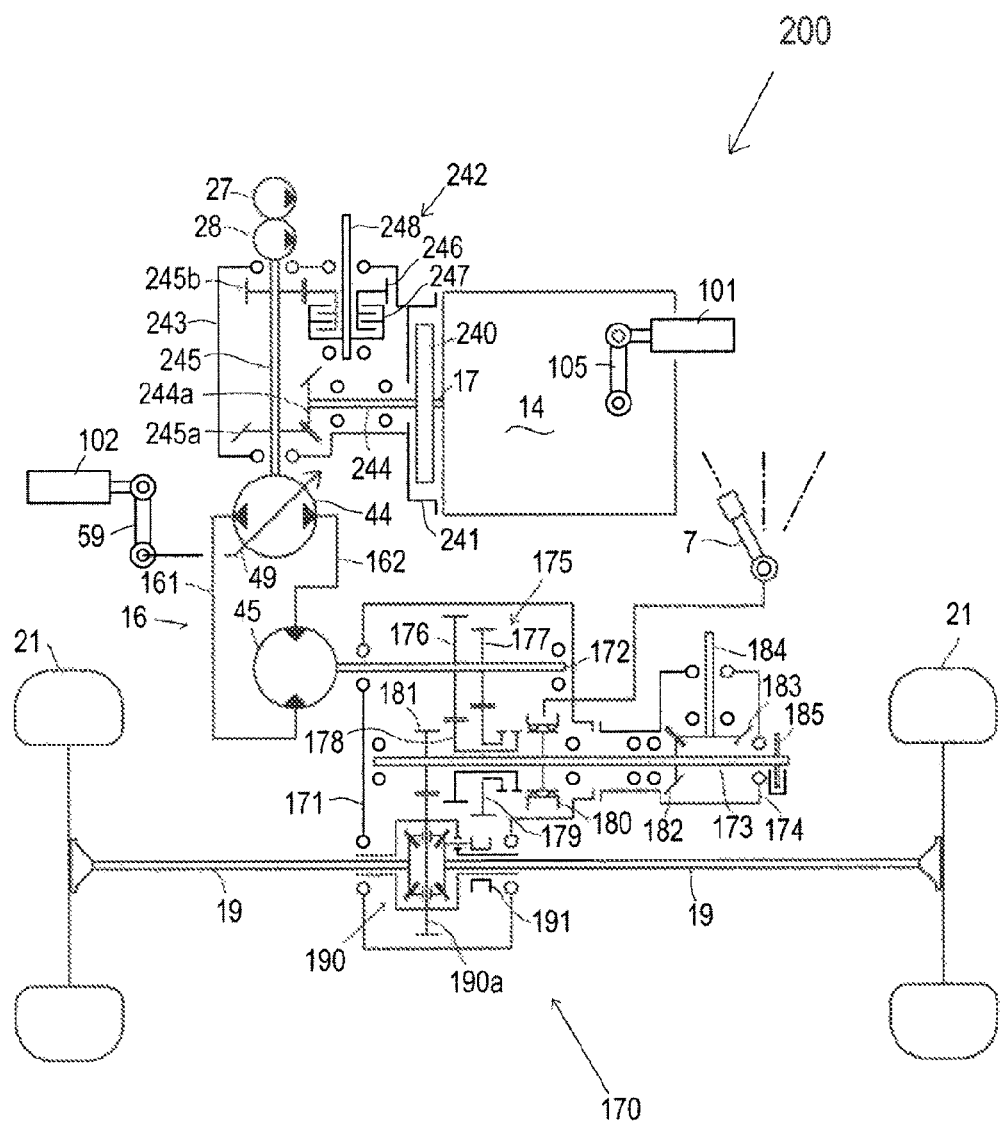
FIG. 13 is a skeleton diagram of an alternative work vehicle.

Referring to FIG. 13, an alternative vehicle 200 will be described. Vehicle 200 includes a transaxle 170 whose transaxle housing 171 carries right and left axles 19. Right and left rear wheels 21 are fixed on distal ends of right and left axles 19 projecting rightward and leftward from transaxle housing 171. Front wheels of vehicle 200 are omitted in FIG. 13.

Vehicle 200 includes engine 14 mounted so as to have engine output shaft 17 extended laterally of vehicle 200 in parallel to axles 19. Engine 14 includes throttle 104 (not shown in FIG. 13), and throttle control lever 105 for controlling opening T of throttle 104 is pivoted on engine 14 so as to be controlled by actuator 101, similar to lever 105 of vehicle 1. An engine PTO unit 242 is joined to engine 14 and is separated from transaxle 170. Engine PTO unit 242 includes a PTO housing 243 joined to engine 14 via a clutch housing 241 incorporating a main clutch 240. In PTO housing 243, a clutch output shaft 244 is extended laterally of vehicle 200 in parallel to axles 19, and is coaxially connected to engine output shaft 17 via main clutch 240.

Hydraulic pump 44 is mounted on PTO housing 243 of engine PTO unit 242, and hydraulic motor 45 is mounted on transaxle housing 171 of transaxle 170. Pipes 161 and 162 are interposed between hydraulic pump 44 and hydraulic motor 45 so as to serve as the pair of main fluid passages fluidly connecting hydraulic pump 44 to hydraulic motor 45, thereby constituting a hydrostatic transmission (HST) 160 including hydraulic pump 44 and hydraulic motor 45. Hydraulic pump 44 has movable swash plate 49 operatively connected to HST control lever 59 that is controlled by actuator 102 so as to control the tilt angle D and direction of swash plate 49, similar to hydraulic pump 44 of vehicle 1. However, HST control lever 59 of vehicle 200 is pivoted on PTO housing 243 of engine PTO unit 242, for example, in contrast to HST control lever 59 of vehicle 1 provided on HST housing 46 mounted on transaxle housing 39 carrying axles 19.

A pump shaft 245 of hydraulic pump 44 is extended in the fore-and-aft direction of vehicle 200 through PTO housing 243. An end portion of pump shaft 245 projecting outward from PTO housing 243 opposite hydraulic pump 44 is provided thereon with PTO hydraulic pumps 27 and 28 so as to serve as a common drive shaft for driving PTO hydraulic pumps 27 and 28. Pump shaft 245 may be shafts joined coaxially to each other.

In PTO housing 243, a bevel gear 244a fixed on clutch output shaft 244 meshes with a bevel gear 245a fixed on pump shaft 245 so as to transmit power from clutch output shaft 244 to pump shaft 245. This power transmitted to pump shaft 245 drives hydraulic pump 44 of HST 160 and PTO hydraulic pumps 27 and 28 simultaneously.

A first PTO shaft 248 is extended in the fore-and-aft direction of vehicle 200 in parallel to pump shaft 245. First PTO shaft 248 is journalled in PTO housing 243 and projects outward from PTO housing 243. In PTO housing 243, a spur gear 246 is provided on first PTO shaft 248 rotatably relative to first PTO shaft 248, and meshes with spur gear 245b fixed on pump shaft 245. A PTO clutch 247 is provided around first PTO shaft 248 in PTO housing 243 so as to be interposed between gear 246 and first PTO shaft 248. Therefore, first PTO shaft 248 is driven by the rotary power of pump shaft 245 only when PTO clutch 247 is engaged in contrast to PTO hydraulic pumps 27 and 28 constantly driven by the rotary power of pump shaft 245.

A motor shaft 172 of hydraulic motor 45 is extended laterally of vehicle 200 in parallel to axles 19 and is journalled in transaxle housing 171 of transaxle 170. Motor shaft 172 may be shafts joined coaxially to each other. A differential unit 190 provided with a differential locking device 191 is disposed in transaxle housing 171 so as to differentially connect right and left axles 19 to each other. A counter shaft 173 is extended laterally of vehicle 200 in parallel to motor shaft 172 and axles 19 and is journalled in transaxle housing 171. In this regard, transaxle housing 171 is joined to a PTO housing 174, and counter shaft 173 is extended into PTO housing 174.

A gear transmission serving as a sub speed control unit 175 is disposed in transaxle housing 171 so as to have high and low speed gear trains interposed between motor shaft 172 and counter shaft 173, while HST 160 serves as a main speed control unit for driving sub speed control unit 175.

A high speed drive gear 176 and a low speed drive gear 177 are fixed on motor shaft 172 in transaxle housing 171. In transaxle housing 171, a high speed driven gear 178 is provided on counter shaft 173 rotatably relative to counter shaft 173, and a low speed driven gear 179 is provided on an axial boss portion of gear 178 rotatably relative to gear 178. Mutually meshing gears 176 and 178 serve as the high speed gear train of sub speed control unit 175. Mutually meshing gears 177 and 179 serve as the low speed gear train of sub speed control unit 175.

A shifter 180 is provided on counter shaft 173 (via a spline hub fixed on counter shaft 173) so as to be unrotatable and axially slidable relative to counter shaft 173, and is operatively connected to travel mode setting lever 7, similar to shifter 80 of vehicle 1 connected to lever 7. A high speed position of shifter 180 engaging with gear 178 corresponds to work travel mode position 113L of lever 7, a low speed position of shifter 180 engaging with gear 179 corresponds to normal travel mode position 113H of lever 7, and a neutral, position of shifter 180 disengaging from gears 178 and 179 corresponds to neutral position 113N of lever 7.

In transaxle housing 171, a final pinion 181 is fixed on counter shaft 173 and meshes with an input gear 190a of differential unit 190 so as to transmit the rotary power of counter shaft 173 to axles 19 via differential unit 190. In PTO housing 174, a bevel gear 182 is fixed on counter shaft 173 and meshes with a bevel gear 183. A second PTO shaft 184 is journalled in PTO housing 174. Second PTO shaft 184 is extended in the fore-and-aft direction of vehicle 200 perpendicular to counter shaft 173, and projects at one end thereof outward from PTO housing 174. Bevel gear 183 is fixed on another end of second PTO shaft 184 in PTO housing 174. Therefore, the rotary power of counter shaft 173 is transmitted to second PTO shaft 184 as well as axles 19 via differential unit 190. Further, an end of counter shaft 173 opposite transaxle housing 171 projects outward from PTO housing 174 so as to be provided thereon with a brake 185.

First PTO shaft 248 supported by engine PTO unit 242 is rather close to rear PTO shaft 24 of vehicle 1 for driving a work device such as cultivator 2 because it is driven by pump shaft 245 of hydraulic pump 44 synchronously to the rotation of engine output shaft 17 regardless of where swash plate 49 of HST 160 and shifter 180 of sub speed control unit 175 are set. On the other hand, second PTO shaft 184 supported by transaxle 170 is rather close to front PTO shaft 22 of vehicle 1 adapted to drive a front transaxle carrying front wheels 20 (omitted in FIG. 13) synchronously to the rotary speed and direction of axles 19 of rear wheels 21 carried by transaxle 170 because second PTO shaft 184 and axles 19 share the rotation of counter shaft 173 serving as the output rotation of HST 160 and sub speed control unit 175, the rotary direction and speed of counter shaft 173 being changed by controlling swash plate 49 of HST 16 0 and shifter 18 0 of sub speed control unit 175.

Any of vehicle speed control systems 100, 100A and 100B may be used for controlling vehicle speed V of vehicle 200 so as to control actuators 101 and 102 for levers 105 and 59 for controlling throttle opening T and swash plate angle D depending on whether travel mode setting lever 7 is set at work travel mode position 113L or normal travel mode position 113H.

In this way, if a work vehicle includes an engine, and an HST, it can use any of vehicle speed control systems 100, 100A and 100B. The engine does well whether it has an engine output shaft extended in the fore-and-aft direction of the vehicle similar to that of vehicle 1 or the lateral direction of the vehicle similar to that of vehicle 200. Also, the HST does well whether it has both the hydraulic pump and the hydraulic motor assembled together similar to that of vehicle 1 or the hydraulic pump and the hydraulic motor materially separated from each other and fluidly connected to each other via pipes or the like similar to that of vehicle 200.

What is claimed is:

1. A traveling speed control system for a work vehicle, comprising:
   an engine whose throttle has a variable throttle opening;
   a hydrostatic transmission driven by the engine, the hydrostatic transmission having a variable output/input speed ratio;
   a travel mode selecting manipulator for selecting either a work travel mode or a normal travel mode; and
   an acceleration manipulator for setting a traveling speed of the work vehicle,
   wherein increase of the throttle opening during idling of the engine is prior to increase of the output/input speed ratio for increasing the traveling speed of the work vehicle when the work travel mode is selected, and the increase of the throttle opening prior to the increase of the output/input speed ratio is canceled when the normal travel mode is selected.

2. The traveling speed control system according to claim 1, further comprising:
   a throttle setting device for setting a throttle opening, wherein, when the work travel mode is selected, the throttle is automatically set at the throttle opening set by the throttle setting device before traveling of the work vehicle so as to realize the increase of throttle opening prior to the increase of output/input speed ratio, and the set throttle opening is kept constant during traveling of the work vehicle in the work travel mode.

3. The traveling speed control system according to claim 1, further comprising:

a throttle setting manipulator for setting a throttle opening, wherein the throttle opening set by the throttle setting manipulator is kept constant during traveling of the work vehicle in the work travel mode; and an alarm, wherein, when the work travel mode is selected and the throttle setting manipulator is not manipulated during idling of the engine to set a throttle opening for traveling of the work vehicle in the work travel mode, the alarm alarms an operator to manipulate the throttle setting manipulator for setting a throttle opening.

4. The traveling speed control system according to claim 1, wherein the work vehicle is equipped with a multi-speed transmission having a low speed drive train and a high speed drive train such that either the low or high speed drive train is selected to transmit power outputted from the hydrostatic transmission, and wherein the selection of the low speed drive train means the selection of the work travel mode, and the selection of the high speed drive train means the selection of the normal travel mode.

5. A traveling speed control system for a work vehicle, comprising:

an engine whose throttle has a variable throttle opening;

a hydrostatic transmission driven by the engine, the hydrostatic transmission having a variable output/input speed ratio;

a travel mode selecting manipulator for selecting either a work travel mode or a normal travel mode; and an acceleration manipulator for setting a traveling speed of the work vehicle, wherein the throttle opening and the output/input speed ratio are increased in correspondence to increase of the traveling speed set by manipulating the acceleration manipulator from 0 to the maximum, wherein when the work travel mode is selected, an increase rate of the throttle opening is larger at start of traveling of the work vehicle than an average increase rate of the throttle opening during increase of the traveling speed of the work vehicle from 0 to the maximum and is reduced according to increase of the set traveling speed, and an increase rate of the output/input speed ratio is smaller at start of traveling of the work vehicle than an average increase rate of the output/input speed ratio during increase of the traveling speed of the work vehicle from 0 to the maximum and is increased according to increase of the set traveling speed, and wherein when the normal travel mode is selected, an increase rate of the throttle opening is smaller at start of traveling of the work vehicle than an average increase rate of the throttle opening during increase of the traveling speed of the work vehicle from 0 to the maximum and is increased according to increase of the set traveling speed, and an increase rate of the output/input speed ratio is larger at start of traveling of the work vehicle than an average increase rate of the output/input speed ratio during increase of the traveling speed of the work vehicle from 0 to the maximum and is reduced according to increase of the set traveling speed.

6. The traveling speed control system according to claim 5, wherein the work vehicle is equipped with a multi-speed transmission, having a low speed drive train and a high speed drive train such that either the low or high speed drive train is selected to transmit power outputted from the hydrostatic transmission, and wherein the selection of the low speed drive train means the selection of the work travel mode, and the selection of the high speed drive train means the selection of the normal travel mode.

* * * * *